(12) United States Patent
Volkerink et al.

(10) Patent No.: US 11,627,436 B2
(45) Date of Patent: Apr. 11, 2023

(54) BATTERY MANAGEMENT

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/449,890

(22) Filed: Oct. 4, 2021

(65) Prior Publication Data

US 2022/0109956 A1 Apr. 7, 2022

Related U.S. Application Data

(60) Provisional application No. 63/122,224, filed on Dec. 7, 2020, provisional application No. 63/087,318, filed on Oct. 5, 2020, provisional application No. 63/087,224, filed on Oct. 4, 2020.

(51) Int. Cl.
*H01M 10/44* (2006.01)
*H04W 4/029* (2018.01)
*H02J 7/00* (2006.01)
*G16Y 20/30* (2020.01)

(52) U.S. Cl.
CPC ............. *H04W 4/029* (2018.02); *H02J 7/007* (2013.01); *H02J 7/00032* (2020.01); *G16Y 20/30* (2020.01)

(58) Field of Classification Search
CPC ...... H02J 7/00032; H02J 7/007; H02J 7/0047; H02J 7/005; H02J 50/005; H04W 4/029; H04W 84/18; H04W 4/70; H04W 88/06; G06Q 10/08; G06Q 50/28; G06Q 2250/05; G16Y 20/30

USPC ........ 320/107, 108, 114, 132, 134, 136, 148
See application file for complete search history.

(56) References Cited

U.S. PATENT DOCUMENTS

| | | |
|---|---|---|
| 7,783,380 B2 | 8/2010 | York et al. |
| 10,438,162 B2 | 10/2019 | Sharma et al. |
| 10,445,756 B2 | 10/2019 | Gonen et al. |
| 2002/0056669 A1 | 5/2002 | Pratt |
| 2004/0039424 A1 | 2/2004 | Merritt et al. |
| 2006/0033475 A1 | 2/2006 | Moore |
| 2006/0080819 A1 | 4/2006 | McAllister |

(Continued)

OTHER PUBLICATIONS

International Patent Application No. PCT/US2021/062239 International Search Report and Written Opinion dated Mar. 29, 2022, 18 pages.

(Continued)

*Primary Examiner* — Edward Tso

(57) ABSTRACT

Apparatus and methods prepare an adhesive tape platform with a battery for disposal at an end of its useful life. The adhesive tape platform determines when it is at the end of its useful life and performs an action to drain remaining battery life of the battery. When remaining life in the battery is less than a threshold level, the adhesive tape platform transmits a ready for disposal notification to an Internet of Things (IOT) system of the adhesive tape platform. The adhesive tape platform may determine its life expectancy and operational phases of the adhesive tape platform and assign battery usage for each of the operational phases such that the battery is depleted at an end of a last one of the operational phases. The adhesive tape platform may activate battery draining circuitry to drain the remaining battery life of the battery.

20 Claims, 25 Drawing Sheets

(56) References Cited

U.S. PATENT DOCUMENTS

| | | |
|---|---|---|
| 2007/0118549 A1 | 5/2007 | Bornhoevd et al. |
| 2009/0266722 A1 | 10/2009 | Rogers et al. |
| 2010/0318553 A1 | 12/2010 | Pirtle et al. |
| 2010/0324959 A1 | 12/2010 | Templeton et al. |
| 2012/0210325 A1 | 8/2012 | De Lind Van Wijngaarden et al. |
| 2012/0303498 A1 | 11/2012 | Cova et al. |
| 2013/0314233 A1 | 11/2013 | Stevens |
| 2015/0256008 A1 | 9/2015 | Miller et al. |
| 2015/0371511 A1* | 12/2015 | Miller .................. G01S 19/16 340/545.6 |
| 2016/0261122 A1 | 9/2016 | Childress et al. |
| 2016/0277884 A1 | 9/2016 | Ehrman et al. |
| 2016/0333226 A1 | 11/2016 | Jo |
| 2018/0052462 A1 | 2/2018 | Arena |
| 2018/0113500 A1 | 4/2018 | Loeffler et al. |
| 2019/0115630 A1 | 4/2019 | Roohparvar et al. |
| 2019/0222055 A1 | 7/2019 | Khoche et al. |
| 2019/0303862 A1 | 10/2019 | Bollinger et al. |
| 2019/0362215 A1* | 11/2019 | Khoche ............ G06K 19/07773 |
| 2020/0092681 A1 | 3/2020 | Shapiro et al. |
| 2020/0265288 A1 | 8/2020 | Volkerink et al. |

OTHER PUBLICATIONS

International Patent Application No. PCT/US2021/053434, International Search Report and Written Opinion dated Feb. 7, 2022, 10 pages.

International Patent Application No. PCT/US2020/058493, International Search Report an Written Opinion dated Feb. 2, 2021, 10 pages.

* cited by examiner

BATTERY MANAGEMENT

RELATED APPLICATIONS

This application claims priority to U.S. Patent Application No. 63/087,224, titled "Controlled Battery To Match Product Useful Life," filed Oct. 4, 2020, U.S. Patent Application No. 63/087,318, titled "Adhesive Tape Platform with Extended Battery Shelf Life," filed Oct. 5, 2020, and to U.S. Patent Application No. 63/087,306, titled "Full Roll System Control," filed Oct. 5, 2020, each of which is incorporated herein in its entirety by reference.

FIELD OF THE DISCLOSURE

This disclosure generally relates to Industrial Internet of Things (IOT) and more particularly to asset management, including tracking, warehousing, inventorying, and monitoring items (e.g., objects, tools, and other equipment).

BACKGROUND

Tracking devices may be used to track people and objects (collectively referred to herein as "assets") in real time and communicate the collected tracking data (e.g., location data) to a server or client device. In a conventional Internet of Things (IOT) system, tracking devices deployed at different nodes may communicate to a central system that provides tracking data to users. In some cases, the tracking devices continuously communicate the full range of tracking data collected to the central system at all times. However, this "always-on" communication results in high power consumption, particularly when the tracking devices are using wireless communication to send data to the central system. Situations may arise where the tracked person or object does not require the full functionality of the tracking device or only requires a limited set of functionalities.

SUMMARY

In one embodiment, a method prepares an adhesive tape platform with a battery for disposal at an end of its useful life. The method includes: determining, by the adhesive tape platform, the end of its useful life; responsive to the determination, performing, by the adhesive tape platform, an action to drain remaining battery life of the battery; determining when remaining life in the battery is less than a threshold level; and transmitting a notification indicating the adhesive tape platform is ready for disposal to an Internet of Things (IOT) system that includes the adhesive tape platform.

In another embodiment, a method prepares an adhesive tape platform with a battery for disposal at an end of its useful life, and includes: determining life expectancy and operational phases of the adhesive tape platform; assigning battery usage for each of the operational phases such that the battery is depleted at an end of a last one of the operational phases; determining an adhesive tape platform configuration for each of the operational phases based on assigned battery usage; configuring the adhesive tape platform with the adhesive tape platform configuration for each operational phase; and following the operational phases with the adhesive tape platform.

In another embodiment, an adhesive tape node with post-manufacture battery activation, includes: a tape structure forming an internal chamber that is not open to ambient air; at least one air channel coupled with the internal chamber and passing into an interfacial region between the adhesive tape node and an adjacent adhesive tape node on a roll, where an end of the at least one air channel, away from the internal chamber, ends within the tape structure and is sealed from ambient air; and an air-activated battery positioned in the internal chamber; wherein cutting through the tape structure at the interfacial region to separate the adhesive tape node from the adjacent adhesive tape node activates the air-activated battery.

In another embodiment, an adhesive tape node with post-manufacture battery activation, includes: a battery; a mechanism preventing activation of the battery; a tape structure encapsulating the battery and the mechanism; a bend line visible on an outer surface of the tape structure; wherein bending the tape structure at the bend line disables the mechanism and activates the adhesive tape node.

In another embodiment, an adhesive tape platform with post-manufacture battery activation, includes: a primary battery; a wireless transducing circuit; a barrier element preventing activation of the primary battery; a battery activation circuit with a barrier puncturing element for permanently disabling the barrier element; a secondary battery for powering the wireless transducing circuit and the battery activation circuit; and a tape structure encapsulating the primary battery, the wireless transducing circuit, the barrier element, the secondary battery, and the battery activation circuit; wherein the wireless transducing circuit controls the battery activation circuit to trigger the barrier puncturing element to activate the primary battery in response to receiving a wireless signal.

In another embodiment, an adhesive tape platform with post-manufacture battery activation, includes: an electronic circuit; an air-activated battery; a tape structure encapsulating the electronic circuit and forming an internal chamber, closed to ambient air, for enclosing the air-activated battery; a first cut line positioned on an outer surface of the tape structure to instruct a user where to cut the tape structure to separate the adhesive tape platform from an adjoining adhesive tape platform; a second cut line positioned on the outer surface of the tape structure to instruct a user where to cut the tape structure to activate the adhesive tape platform; at least one air channel coupled with the internal chamber and running perpendicular to, and passing beneath, the second cut line, where an end of the at least one air channel, away from the internal chamber, ends within the tape structure and is sealed from ambient air; and wherein cutting through the tape structure along the second cut line activates the air-activated battery by allowing air to enter the internal chamber.

DETAILED DESCRIPTION

Figure 1:
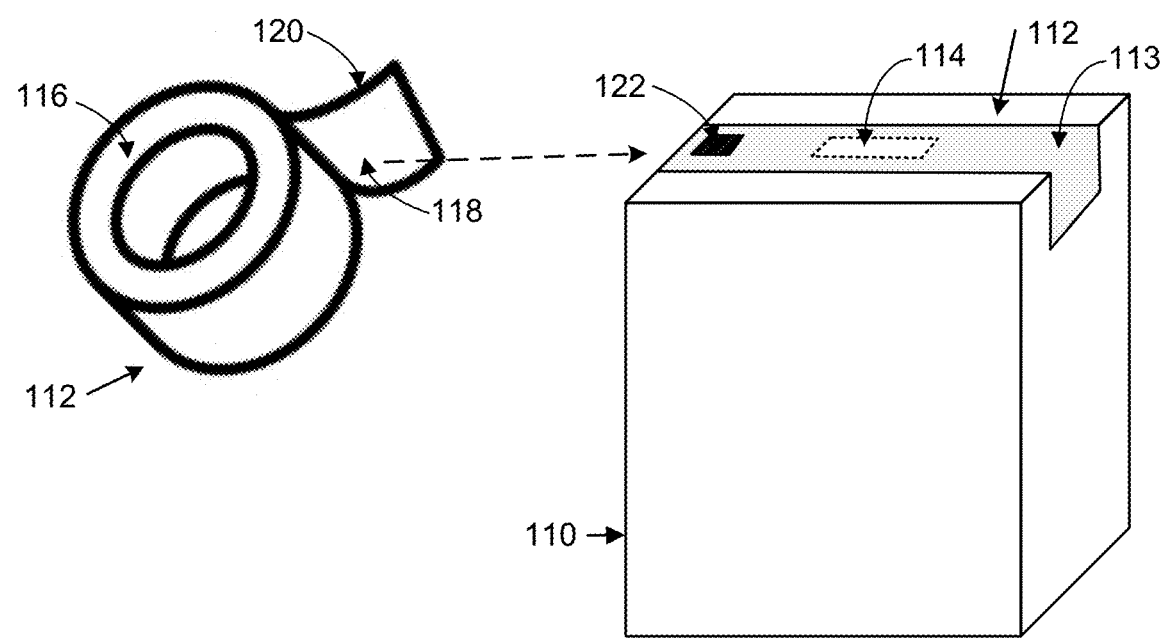
FIG. 1 shows one example adhesive tape platform, including a wireless transducing circuit, that is used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In some contexts, the term "agent" may refer to a "node," and an "agent" or "node" may be adhesively applied to a surface and denoted as an "adhesive tape platform," a "tape node," or a "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to as a "master agent."

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component," and "unit" refer to hardware, software, or firmware, or a combination thereof.

Adhesive Tape Platform

FIG. 1 shows an example adhesive tape platform 112, including a wireless transducing circuit 114, used to seal a package 110 for shipment. In this example, a segment 113 is dispensed from a roll 116 to give the adhesive tape platform 112 that is affixed to the package 110. The adhesive tape platform 112 includes an adhesive side 118 and a non-adhesive surface 120. The adhesive tape platform 112 may be dispensed from the roll 116 in the same way as any conventional packing tape, shipping tape, or duct tape. For example, the adhesive tape platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
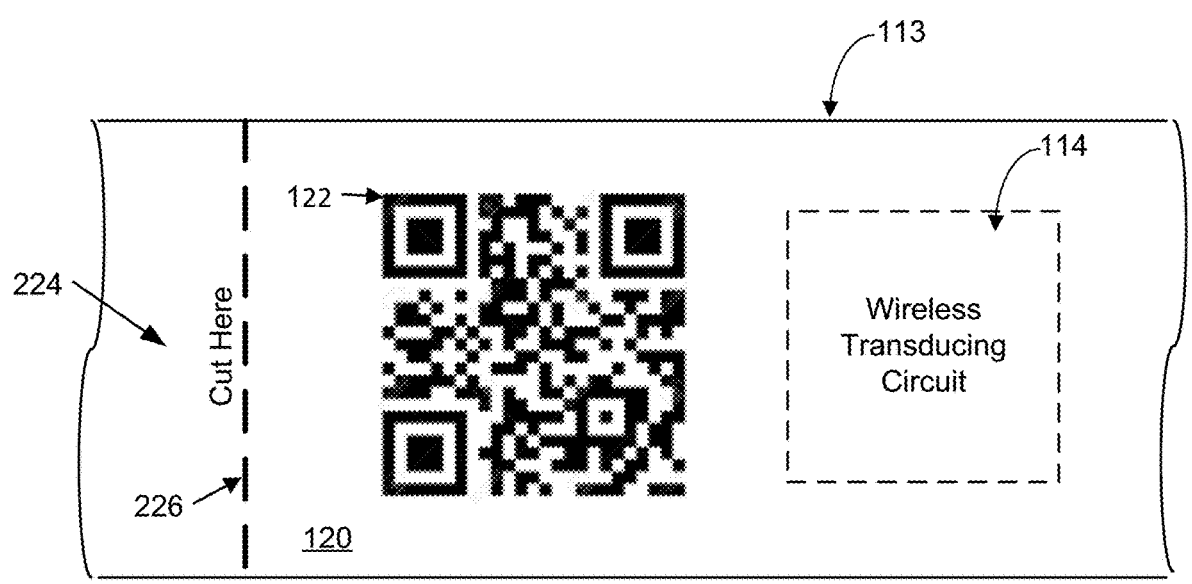
FIG. 2 shows the non-adhesive surface of the segment of the adhesive tape platform of FIG. 1 including writing or other markings, in embodiments.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape platform 112 that is dispensed to seal the package 110 corresponds to a single segment of the adhesive tape platform 112. In other examples, the length of the adhesive tape platform 112 needed to seal a package or otherwise serve the adhesive function for which the adhesive tape platform 112 is being applied may include multiple segments 113 of the adhesive tape platform 112, one or more of which segments 113 may be activated upon cutting the length of the adhesive tape platform 112 from the roll 116 and/or applying the segment 113 of the adhesive tape agent platform 112 to the package 110.

In some examples, the wireless transducing circuits 114 embedded in one or more segments 113 of the adhesive tape platform 112 are activated when the adhesive tape agent platform 112 is cut along the cut line 226. In these examples, the adhesive tape platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape platform 112 in response to being separated from the adhesive tape platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
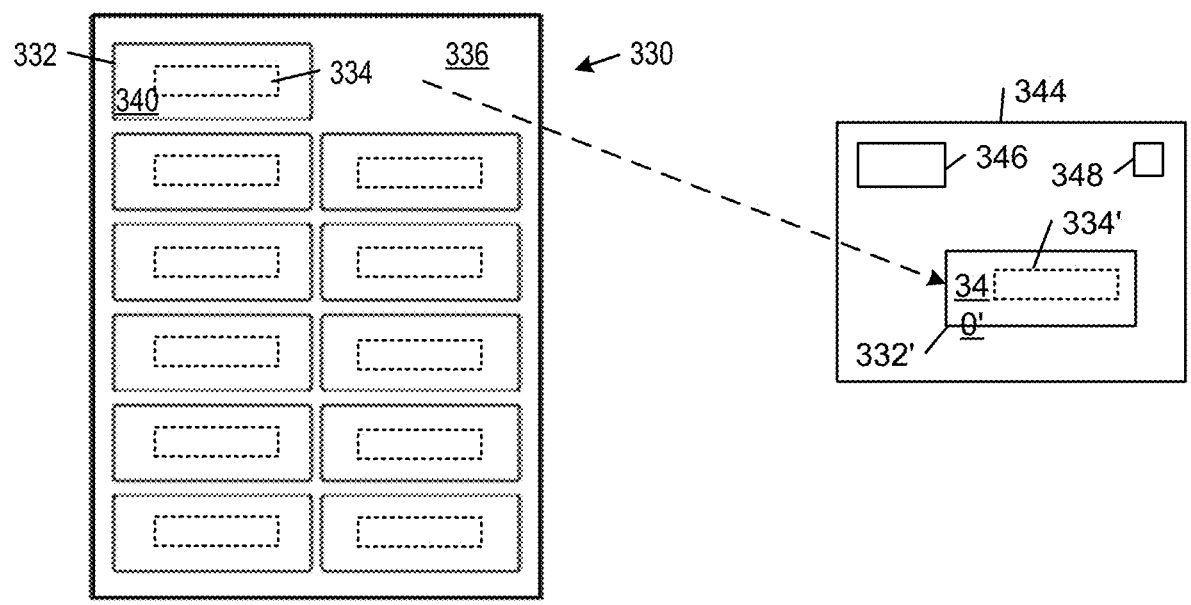
FIG. 3 shows one example adhesive tape platform that includes a set of adhesive tape platform segments on a backing sheet with a release coating that prevents the adhesive segments from adhering strongly to the backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
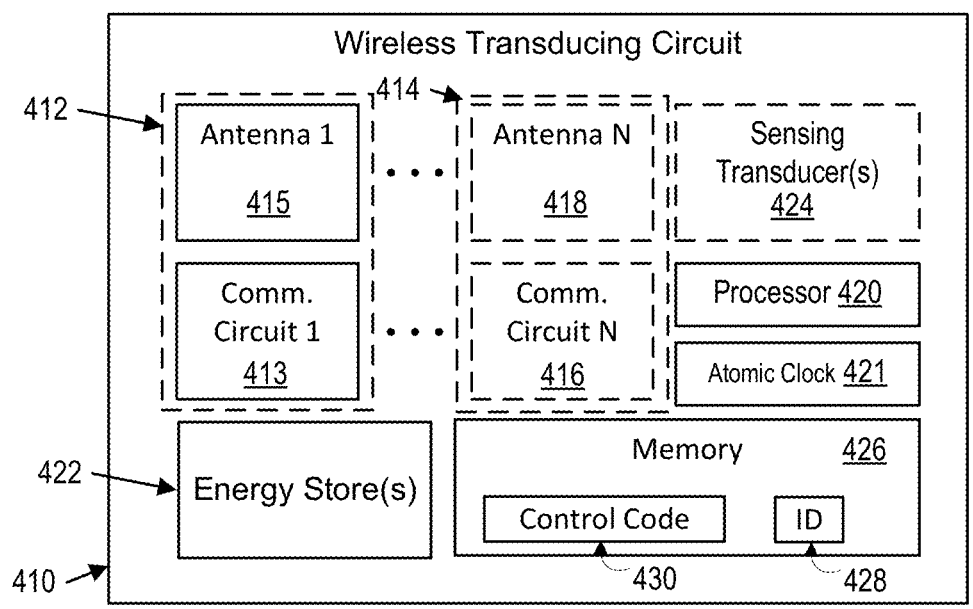
FIG. 4 is a block diagram showing components of an example wireless transducing circuit that includes one or more wireless communication modules, in embodiments.

FIG. 4 is a block diagram showing components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or the sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
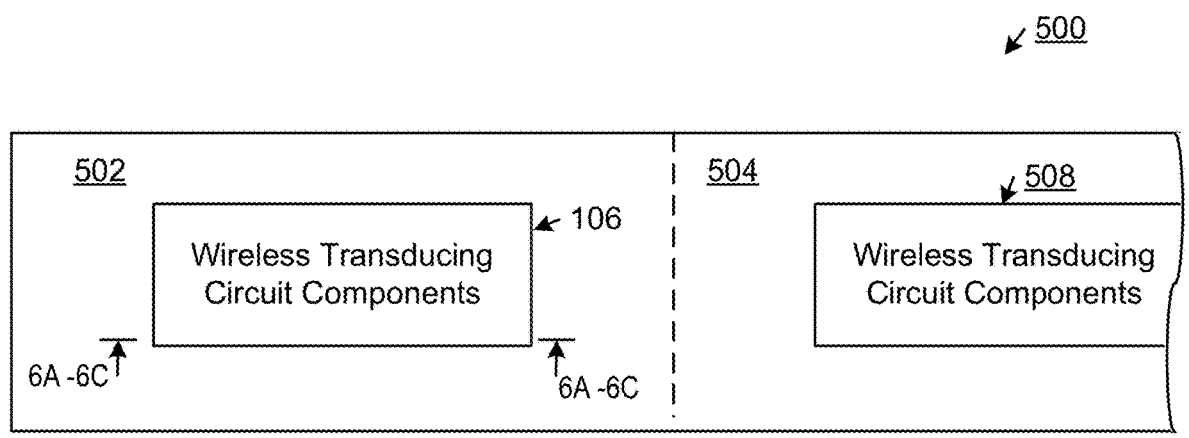
FIG. 5 is a top view of a portion of one example flexible adhesive tape platform that shows a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
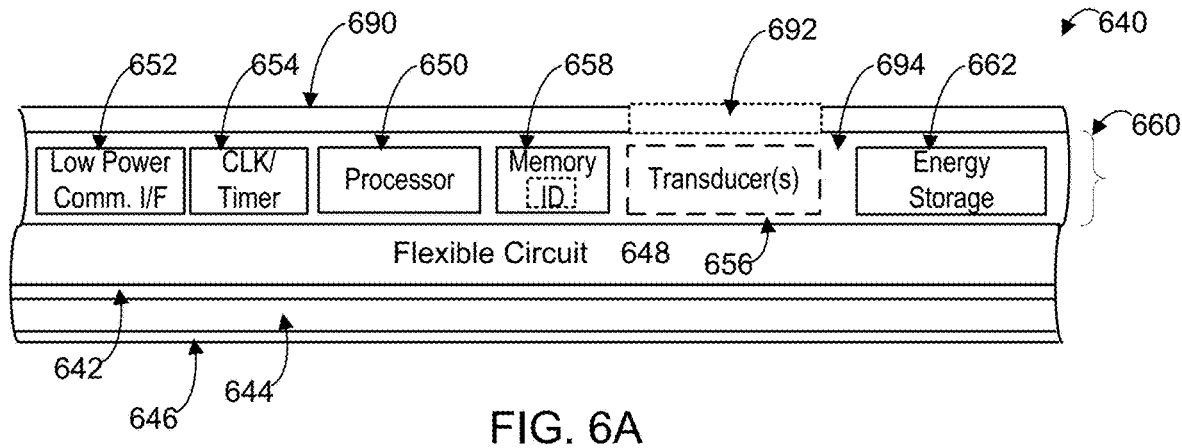
FIGS. 6A-6C are cross-sectional views of example adhesive tape agent platforms, in embodiments.
Figure 6B:
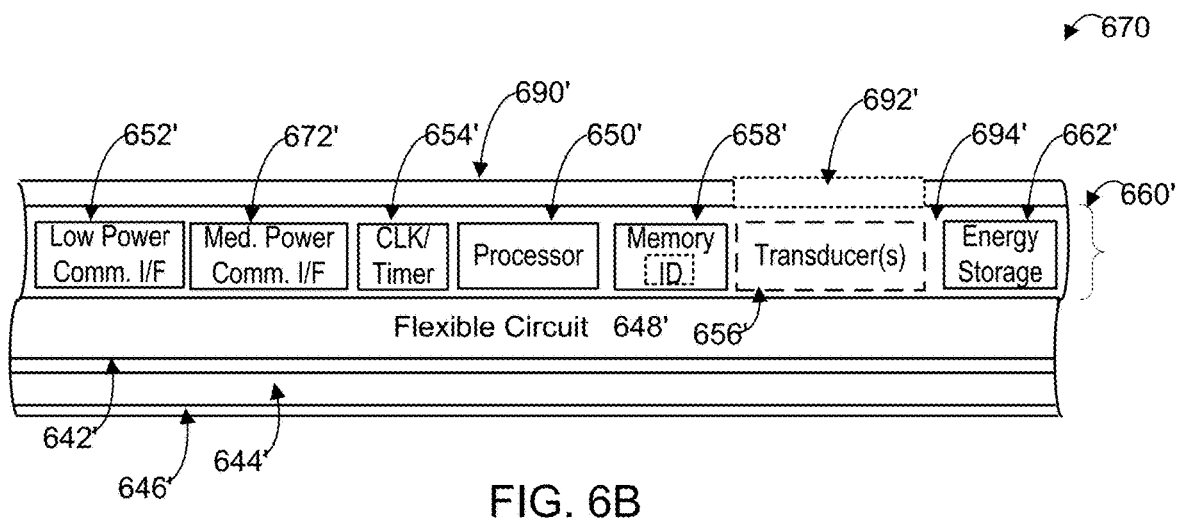
Figure 6C:
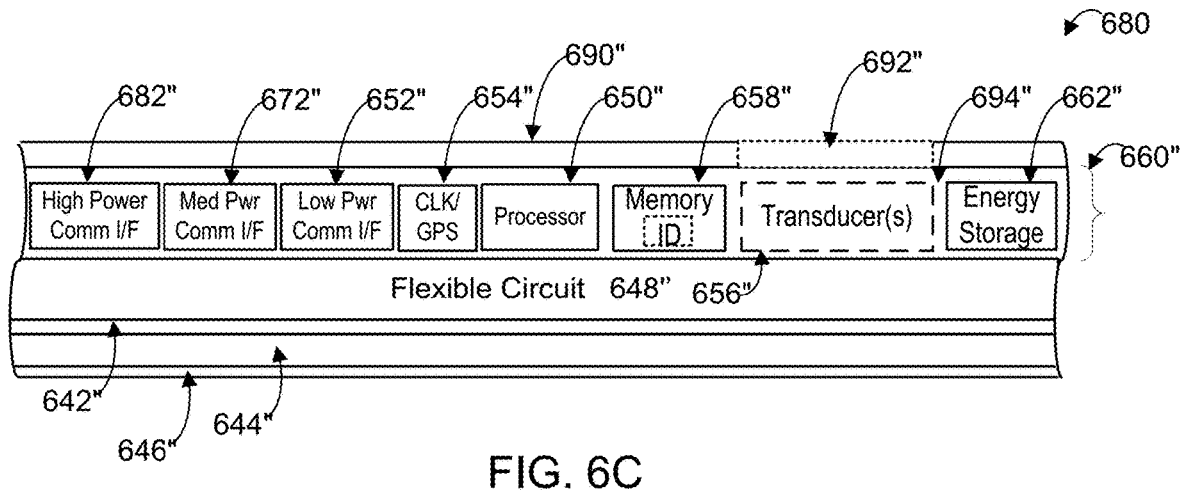
Figure 7A:
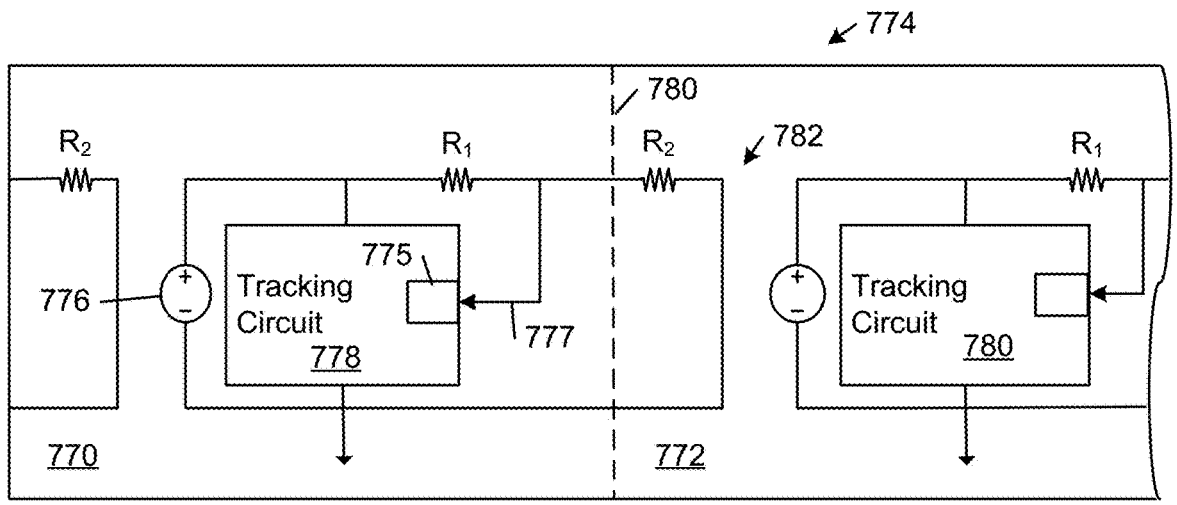
FIGS. 7A and 7B show example segments of adhesive tape platforms with wake circuits, in embodiments.
Figure 7B:
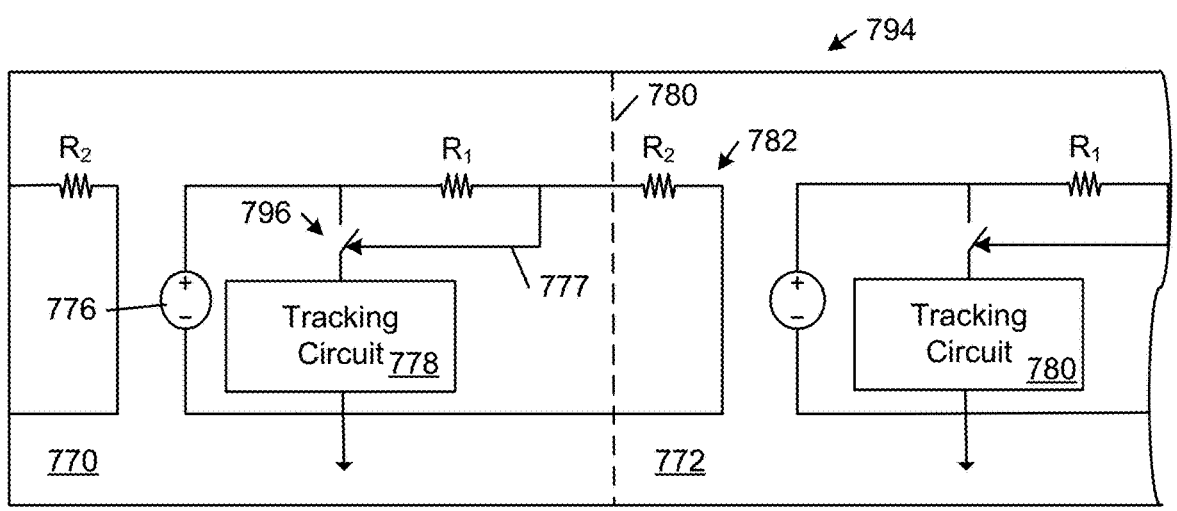
Figure 7C:
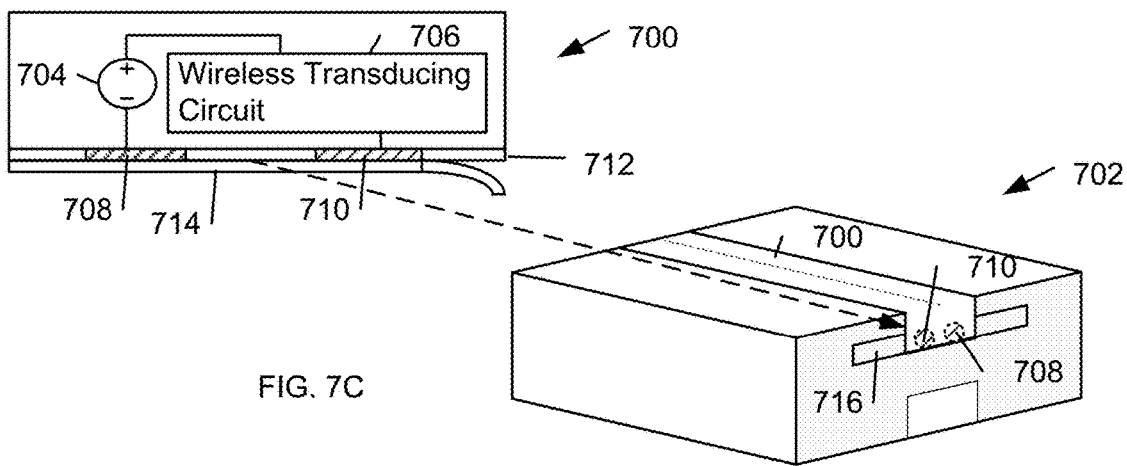
FIG. 7C shows a diagrammatic cross-sectional front view of one example adhesive tape platform and a perspective view of an example asset, in embodiments.

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low-power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communication-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape platform (e.g., platform 502 of FIG. 5) that includes a respective set of the components of the wireless transducing circuit 410 corresponding to the third tape-node type (e.g., black). The segment 680 is similar to the segment 670 of FIG. 6B, but further includes a high-power communication-interface 682" (e.g., a cellular interface; e.g., GSM/GPRS) in addition to a low-power communication-interface 652", and may include a medium-power communication-interface 672". The high-power communication-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communication-interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
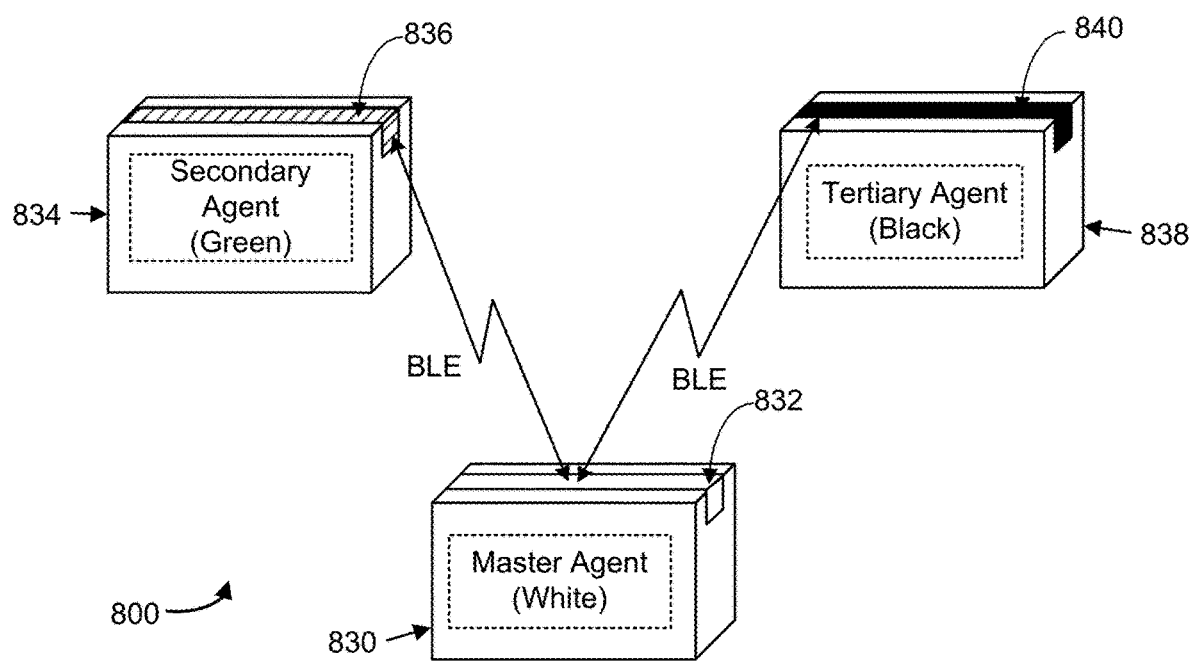
FIG. 8 shows a network including a master agent, a secondary agent, and a tertiary agent, attached to three packages, in embodiments.

FIG. 8 shows a network 800 including three agents, a master agent 832, a secondary agent 836, and a tertiary agent 840, attached to three packages 830, 834, and 838 (also referred to herein as parcels, boxes, containers, etc.), respectively, where each of the packages 830, 834, and 838 are associated with respective tape agents 832, 836, 840. FIG. 8 is not meant to be limited to agents attached to packages but may rather be agents attached to infrastructure (e.g., walls, pillars, buildings, etc.) or vehicles (e.g., automobiles, planes, ships, trains, drones, etc.) or any other object the agent is capable of being attached to. For example, the master agent 832 may be attached to a package (e.g., the first package 830) and the secondary and tertiary agents 836, 840 are attached to infrastructure, such as a wall or a building.

Continuing with the embodiment in FIG. 8, the master-agent 832 child-node is attached to the first package 830, has a low-power wireless-communication-interface (e.g., Bluetooth LE), and is optionally marked with a white-colorant. The secondary agent 836 intermediate-node is attached to the second package 834, has a low-power wireless-communication-interface (e.g., Bluetooth LE) and a medium-power communication-interface (e.g., LoRa), and is optionally marked with a green-colorant. The tertiary agent 840 parent node is attached to a third package 838, has three low-power communication-interfaces (e.g., Bluetooth LE, NFC, and RFID), a medium-power communication-interface (e.g., LoRa), and a high-power communication-interface (e.g., cellular), and is optionally marked with a black colorant. The communication-interfaces of the secondary agent 836 and the tertiary agent 840 are backward compatible with the communication-interface (e.g., Bluetooth LE) of the master agent 832.

In addition to packaging applications, the master, secondary, and tertiary agents 832, 836, and 840 may be deployed on or within physical premises, such as buildings, warehouses, and other infrastructure. For example, in some embodiments, the secondary and tertiary agents 836, 840 may be deployed on physical premises infrastructure (e.g., walls, doors, and conveyor systems), vehicles (e.g., fork lifts, trucks, and carts), and objects (e.g., boxes, packages, documents, coffee mugs).

In prior art network-connectivity, nodes are arranged hierarchically with higher-power parent nodes designated as master nodes that are conceptually located at higher levels in a typical node-hierarchy and have unilateral control over the low-power child nodes, which are conceptually located at the bottom level of the hierarchy. In the prior art network-connectivity, the master nodes (e.g., the secondary and tertiary agents of the present disclosure) are configured to periodically scan for transmissions from the child nodes (e.g., the master agent of the present disclosure). As a result, a high demand is placed on the resources of the master nodes (e.g., the secondary and tertiary agents of the present disclosure). This demand is particularly high when there are numerous child nodes (e.g., the master agent of the present disclosure), which tends to rapidly decrease the battery levels of the master nodes (e.g., the secondary and tertiary agents of the present disclosure) and increase network congestion between the high-power master nodes and the numerous child nodes.

In contrast to the prior art network-connectivity, for the network-connectivity of network 800, the roles of the parent-child relationship in the prior art network-connectivity have switched: the low-power child-node is the master node (e.g., master agent 832), which has unilateral control over the parent nodes (e.g., the secondary agent 836 and the tertiary agent 840). As a result, many of the tasks previously performed by the secondary and tertiary agents are unnecessary. For example, in the networks of FIGS. 8, 12, and 9, there is no need for the higher-level parent-nodes to scan for transmissions from the child nodes; instead, the master agent 832 (child node) drives the communications flow from the master agent 832 to the secondary agents and the tertiary agents 836, 840. The master agent 832 transmits service requests to the secondary agent 836 or the tertiary agent 840, or both. In this way, there is no need for the secondary agent 836 and the tertiary agent 840 to continuously scan for packet transmissions from the child nodes; the master agent 832 may initiate a scan to transmit packets to the secondary and tertiary agents 836, 840. In addition, the child nodes operate autonomously, and thereby substantially avoid network congestion by sending requests for service to the secondary and tertiary agents 836, 840 only when needed.

In some embodiments, one or more of the master agent 832, the secondary agent 836, and the tertiary agent 840 receive data that includes descriptions of the resources that are available from the master agents 832 over the network 800. Examples of such resources are sensors, such as a temperature sensor, a moisture sensor, and an acceleration sensor; communication interfaces, such as Bluetooth communication-interfaces, LoRa communication-interfaces, and cellular communication-interfaces; power sources, such as mains power and battery power; and memory resources. In one operational example, when the master agent (child node) detects that it has insufficient resources to complete a task, the master agent (child node) broadcasts, to other agents within wireless range, a request asking whether the insufficiency (e.g., a sensor required to collect data of a certain type, such as a vibration sensor to collect vibration data, and accelerometer to detect movement, etc.) may be remedied by at least one of the other agents sharing one or more resources (e.g., sensors, such as a vibration sensor or an accelerometer). In this example, the master agent (child node) broadcasts, using low-power communication interface 652 of FIG. 6A, a message requesting the type of resource required and a deadline for completing the task. If at least one other agent in the environment of the master agent that receives the message is able to satisfy the request, the other agent sends a reply message to the master agent (child node). Where multiple agents respond, the master agent (child node) may select one of the multiple agents to provide the resource based on one or more criteria (e.g., the first agent to reply to the request). Accordingly, the master agent (child node) may receive a confirmation message from the other agent indicating that the requested task either was completed or was not completed. Depending on the type of task to be performed by the selected agent, the master agent (child node) may or may not receive a data payload in the confirmation message.

Figure 9:
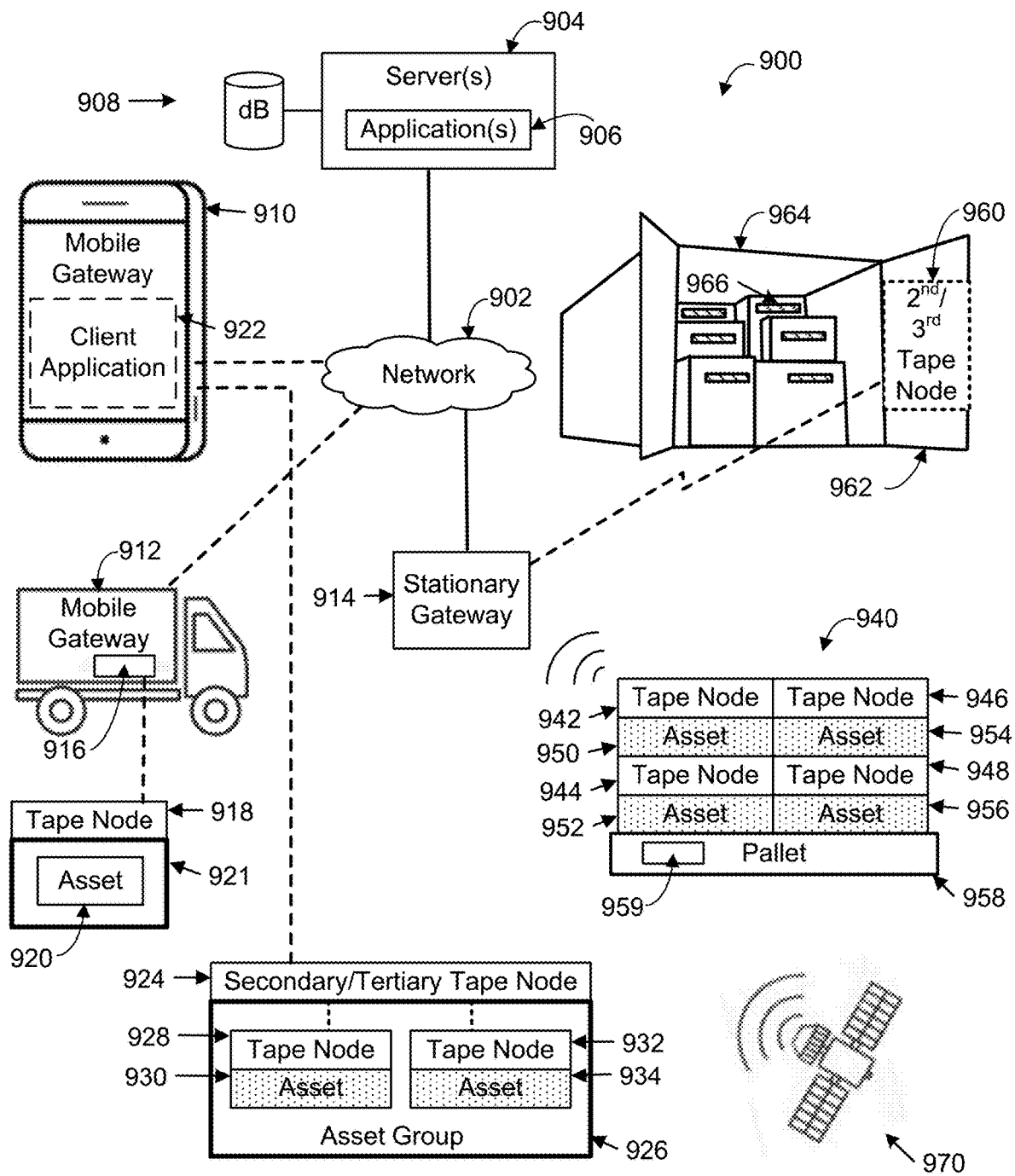
FIG. 9 shows one example network that supports communication between one or more servers, mobile gateways, stationary gateways, and various types of tape nodes associated with various assets, in embodiments.

FIG. 9 shows an example network communications environment 900 that includes a network 902 that supports communications between one or more servers 904 executing one or more applications of a network service 908, mobile gateways 910 (a smart device mobile gateway), 912 (a vehicle mobile gateway), a stationary gateway 914, and various types of tape nodes that are associated with various assets (e.g., parcels, equipment, tools, persons, and other things). Hereinafter "tape nodes" may be used interchangeably with the "agents", as described above, with reference to FIGS. 1-9; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 902 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 902 includes communications infrastructure equipment, such as a geolocation satellite system 970 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 920) or other stationary (e.g., stationary gateway 914) or mobile object (e.g., a, such as a delivery truck, such as mobile gateway 912) or stationary object (e.g., a structural element of a building) This process activates the tape node (e.g., the tape node 918) and causes the tape node 918 to communicate with the one or more servers 904 of the network service 908. In this process, the tape node 418 may communicate through one or more other tape nodes (e.g., the tape nodes 942, 944, 946, 948) in the communication hierarchy. In this process, the one or more servers 904 executes the network service application 906 to programmatically configure tape nodes 918, 924, 928, 932, 942, 944, 946, 948, that are deployed in the network communications environment 900. In some examples, there are multiple classes or types of tape nodes (e.g., the master agent 832, secondary agent 836, or tertiary agent 840 shown in FIG. 8), where each tape node class has a different respective set of functionalities and/or capacities, as described above with respect to the "agents" in FIGS. 1-9. For example, the master agents 832 (with reference to FIG. 8) have a lower-power wireless communication interface (e.g., the low-power wireless-communication interface 652, with reference to FIG. 6), in comparison to the secondary and tertiary agents 836, 840 (with reference to FIG. 8).

In some examples, the one or more servers 904 communicate over the network 902 with one or more gateways 910, 912, 914 that are configured to send, transmit, forward, or relay messages to the network 902 in response to transmissions from the tape nodes 918, 924, 928, 932, 942, 944, 946, 948 that are associated with respective assets and within communication range. Example gateways include mobile gateways 910, 912 and a stationary gateway 914. In some examples, the mobile gateways 910, 912, and the stationary gateway 914 are able to communicate with the network 902 and with designated sets or groups of tape nodes.

In some examples, the mobile gateway 912 is a vehicle (e.g., a delivery truck or other mobile hub) that includes a wireless communications unit 916 that is configured by the network service 908 to communicate with a designated network of tape nodes, including tape node 918 (e.g., a master tape node) in the form of a label that is adhered to a parcel 921 (e.g., an envelope) that contains an asset 920, and is further configured to communicate with the network service 908 over the network 902. In some examples, the tape node 918 includes a lower-power wireless-communication-interface of the type used in, e.g., segment 640 (shown in FIG. 6A), and the wireless communications unit 916 may implemented by a secondary or tertiary tape node (e.g., one of segment 670 or segment 680, respectively shown in FIGS. 6B and 6C) that includes a lower-power communication-interfaces for communicating with tape nodes within range of the mobile gateway 912 and a higher-power communication-interface for communicating with the network 902. In this way, the tape node 918 and wireless communications unit 916 create a hierarchical wireless network of tape nodes for transmitting, forwarding, bridging, relaying, or otherwise communicating wireless messages to, between, or on behalf of the tape node 918 in a power-efficient and cost-effective way.

In some examples, a mobile gateway 910 is a mobile phone that is operated by a human operator and executes a client application 922 that is configured by a network service to communicate with a designated set of tape nodes, including a secondary or tertiary tape node 924 that is adhered to a parcel 926 (e.g., a box), and is further configured to communicate with a server 904 over the network 902. In the illustrated example, the parcel 926 contains a first parcel labeled or sealed by a master tape node 928 and containing a first asset 930, and a second parcel labeled or sealed by a master tape node 932 and containing a second asset 934. The secondary or tertiary tape node 924 communicates with each of the master tape nodes 928, 932 and also communicates with the mobile gateway 910. In some examples, each of the master tape nodes 928, 932 includes a lower-power wireless-communication-interface of the type used in, e.g., segment 640 (shown in FIG. 6A), and the secondary/tertiary tape node 924 is implemented by a tape node (e.g., segment 670 or segment 680, shown in FIGS. 6B and 6C) that includes a low-power communication-interface for communicating with the master tape nodes 928, 932 contained within the parcel 926, and a higher-power communication-interface for communicating with the mobile gateway 910. The secondary or tertiary tape node 924 is operable to relay wireless communications between the master tape nodes 928, 932 contained within the parcel 926 and the mobile gateway 910, and the mobile gateway 910 is operable to relay wireless communications between the secondary or tertiary tape node 924 and the server 904 over the network 902. In this way, the master tape nodes 928 and 932 and the secondary or tertiary tape node 924 create a wireless network of nodes for transmitting, forwarding, relaying, or otherwise communicating wireless messages to, between, or on behalf of the master tape nodes 928, 932, the secondary or tertiary tape node 924, and the network service (not shown) in a power-efficient and cost-effective way.

In some examples, the stationary gateway 914 is implemented by a server 904 executing a network service application 906 that is configured by the network service 908 to communicate with a designated set 940 of master tape nodes 942, 944, 946, 948 that are adhered to respective parcels containing respective assets 950, 952, 954, 956 on a pallet 958. In other examples, the stationary gateway 914 is implemented by a secondary or tertiary tape node 960 (e.g., segments 670 or 680, respectively shown in FIGS. 6B and 6C) that is adhered to, for example, a wall, column or other infrastructure component of the physical premise's environment 900, and includes a low-power communication-interface for communicating with nodes within range of the stationary gateway 914 and a higher-power communication-interface for communicating with the network 902.

In one embodiment, each of the master tape nodes 942-948 is a master tape node and is configured by the network service 908 to communicate individually with the stationary gateway 914, which relays communications from the master tape nodes 942-948 to the network service 908 through the stationary gateway 914 and over the network 902. In another embodiment, one of the master tape nodes 942-948 at a time is configured to transmit, forward, relay, or otherwise communicate wireless messages to, between, or on behalf of the other master nodes on the pallet 958. In this embodiment, the master tape node may be determined by the master tape nodes 942-948 or designated by the network service 908. In some examples, the master tape nodes 942-948 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 959 is adhered to the pallet 958 and is configured to perform the role of a master node for the other master tape nodes 942-948. In these ways, the master tape nodes 942-948, 959 are configurable to create different wireless networks of nodes for transmitting, forwarding, relaying, bridging, or otherwise communicating wireless messages with the network service 408 through the stationary gateway 914 and over the network 902 in a power-efficient and cost-effective way.

In the illustrated example, the stationary gateway 914 also is configured by the network service 908 to communicate with a designated network of tape nodes, including the secondary or tertiary tape node 960 that is adhered to the inside of a door 962 of a shipping container 964, and is further configured to communicate with the network service 908 over the network 902. In the illustrated example, the shipping container 964 contains a number of parcels labeled or sealed by respective master tape nodes 966 and containing respective assets. The secondary or tertiary tape node 960 communicates with each of the master tape nodes 966 within the shipping container 964 and communicates with the stationary gateway 914. In some examples, each of the master tape nodes 966 includes a low-power wireless communication-interface (e.g., the low-power wireless-communication interface 652, with reference to FIG. 6A), and the secondary or tertiary tape node 960 includes a low-power wireless-communication-interface (low-power wireless-communication interfaces 652', 652", with reference to FIGS. 6B-6C) for communicating with the master tape nodes 966 contained within the shipping container 964, and a higher-power wireless-communication-interface (e.g., medium-power wireless-communication interface 672', medium-power wireless-communication interface 672", high-power wireless-communication interface 682", with reference to FIGS. 6B-6C) for communicating with the stationary gateway 914. In some examples, either a secondary or tertiary tape node, or both, may be used, depending on whether a high-power wireless-communication interface is necessary for sufficient communication.

In some examples, when the doors of the shipping container 964 are closed, the secondary or tertiary tape node 960 is operable to communicate wirelessly with the master tape nodes 966 contained within the shipping container 964. In some embodiments, both a secondary and a tertiary node are attached to the shipping container 964. Whether a secondary and a tertiary node are used may depend on the range requirements of the wireless-communication-interface. For example, if out at sea a node will be required to transmit and receive signals from a server located outside the range of a medium-power wireless-communication-interface, a tertiary node will be used because the tertiary node includes a high-power wireless-communication-interface.

In an example, the secondary or tertiary tape node 960 is configured to collect sensor data from master tape nodes 966 and, in some embodiments, process the collected data to generate, for example, statistics from the collected data. When the doors of the shipping container 964 are open, the secondary or tertiary tape node 960 is programmed to detect the door opening (e.g., using a photodetector or an accelerometer component of the secondary or tertiary tape node 960) and, in addition to reporting the door opening event to the network service 908, the secondary or tertiary tape node 960 is further programmed to transmit the collected data and/or the processed data in one or more wireless messages to the stationary gateway 914. The stationary gateway 914, in turn, is operable to transmit the wireless messages received from the secondary or tertiary tape node 960 to the network service 908 over the network 902. Alternatively, in some examples, the stationary gateway 914 also is operable to perform operations on the data received from the secondary or tertiary tape node 960 with the same type of data produced by the secondary or tertiary tape node 960 based on sensor data collected from the master tape nodes 942-948. In this way, the secondary or tertiary tape node 960 and master tape node 966 create a wireless network of nodes for transmitting, forwarding, relaying, or otherwise communicating wireless messages to, between, or on behalf of the master tape node 966, the secondary or tertiary tape nodes 960, and the network service 908 in a power-efficient and cost-effective way.

In an example of the embodiment shown in FIG. 9, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-9). The short-range master tape nodes typically are adhered directly to parcels containing assets. In the illustrated example, the master tape nodes 918, 928, 932, 942-948, 966 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 926 and a shipping container 964) that are associated with multiple parcels that are separated from the medium-range tape nodes by a barrier or a long distance. In the illustrated example, the secondary and/or tertiary tape nodes 924 and 960 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 900.

In the illustrated example, the mobile gateway 912 and the stationary gateway 914 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 912 (e.g., a truck). In these examples, the wireless communications unit 916 may be moved to different locations in the network communications environment 900 to assist in connecting other tape nodes to the wireless communications unit 916. In some examples, the stationary gateway 914 is a tape node that may be attached to a stationary structure (e.g., a wall) in the network communications environment 900 with a known geographic location (e.g., GPS coordinates). In these examples, other tape nodes in the environment may determine their geographic location by querying the stationary gateway 914.

In some examples, in order to conserve power, the tape nodes typically communicate according to a schedule promulgated by the network service 908. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 904, either directly or indirectly through a gateway tape node (e.g., the long-range tape node, such as wireless communication unit 916, adhered to the mobile gateway 912, or a long-range tape node, such as stationary gateway 914, that is adhered to an infrastructure component of the network communications environment 900). In other examples, the master tape node processes the information contained in the received data packets and transmits the processed information to the server 904.

Figure 10:
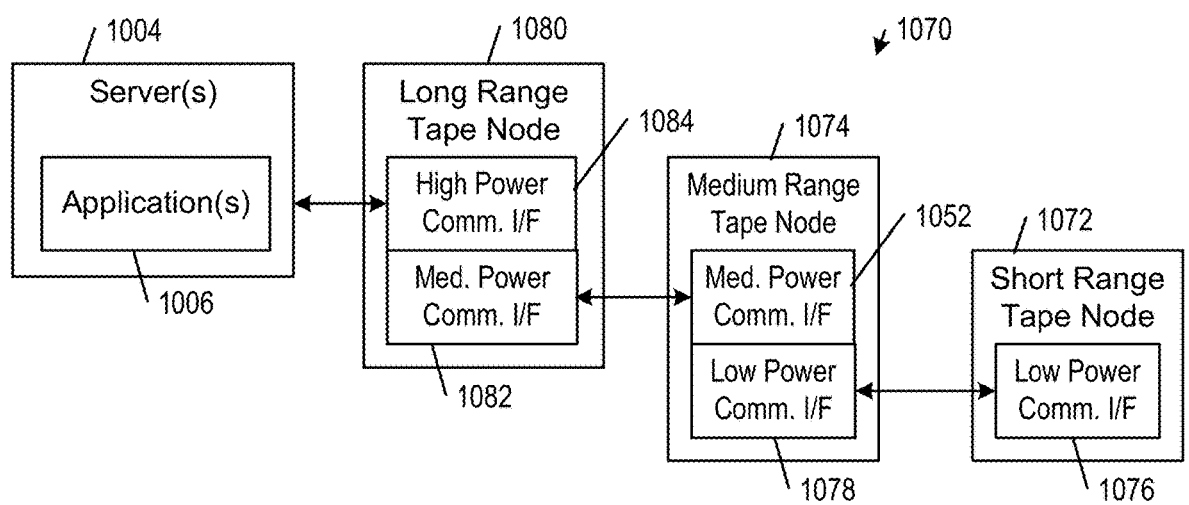
FIG. 10 shows an example hierarchical wireless communications network of tape nodes, in embodiments.

FIG. 10 shows an example hierarchical wireless communications network of tape nodes 1070. In this example, the short-range tape node 1072 and the medium range tape node 1074 communicate with one another over their respective low-power wireless communication interfaces 1076, 1078. The medium range tape node 1074 and the long-range tape node 1080 communicate with one another over their respective medium-power wireless communication interfaces 1078, 1082. The long-range tape node 1080 and the one or more network service servers 1004 communicate with one another over the high-power communication interface 1084. In some examples, the low-power communication interfaces 1076, 1078 establish wireless communications with one another in accordance with the Bluetooth LE protocol, the medium-power communication interfaces 1086, 1082 establish wireless communications with one another in accordance with the LoRa communications protocol, and the high-power communication interface 1084 establishes wireless communications with the one or more network service servers 1004 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 1004 of the network service 1008 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 1004 of the network service 1008. The schedule usually dictates all aspects of the communication, including the times when particular tape nodes should communicate, the mode of communication, and the contents of the communication. In one example, the one or more network service servers 1004 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 1004, either directly or indirectly through a gateway tape node (e.g., the long-range wireless communication unit 1016 adhered to the mobile gateway 1012 (which could be a vehicle, ship, plane, etc.) or the stationary gateway 1014 is a long-range tape node adhered to an infrastructure component of the environment 1000). In other examples, the master tape node processes the information contained in the received data packets and transmits the processed information to the one or more network service servers 1004.

Figure 11:
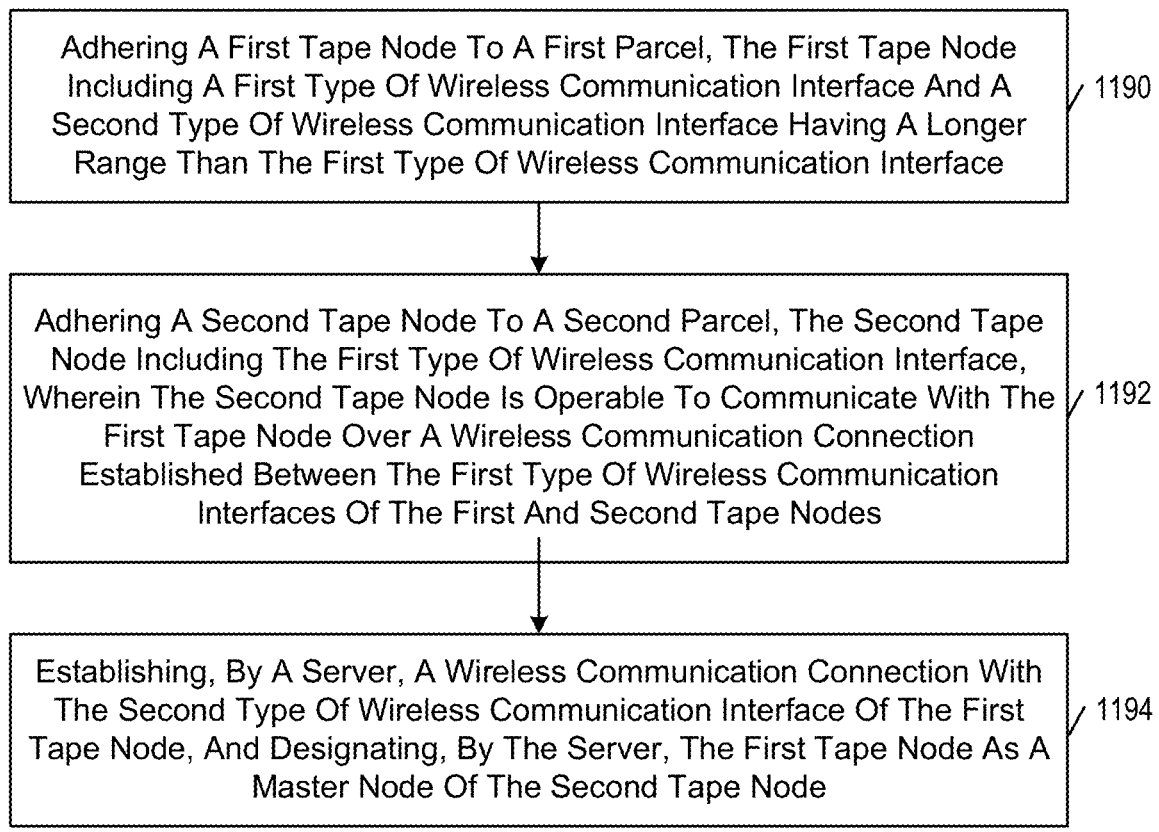
FIG. 11 shows an example method of creating a hierarchical communications network, in embodiments.

FIG. 11 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 11, block 1190). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 11, block 1192). An application executing on a computer system (e.g., the one or more network service servers 1004 of a network service 1008) establishes a wireless communication connection with the second type of wireless communication interface of the first tape node, and the application transmits programmatic code executable by the first tape node to function as a master tape node with respect to the second tape node (FIG. 11, block 1194).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. For example, the non-tape node may include substantially similar functionality as the tape nodes, except for having an adhesive surface/platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communication-interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize changing to a lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 12A:
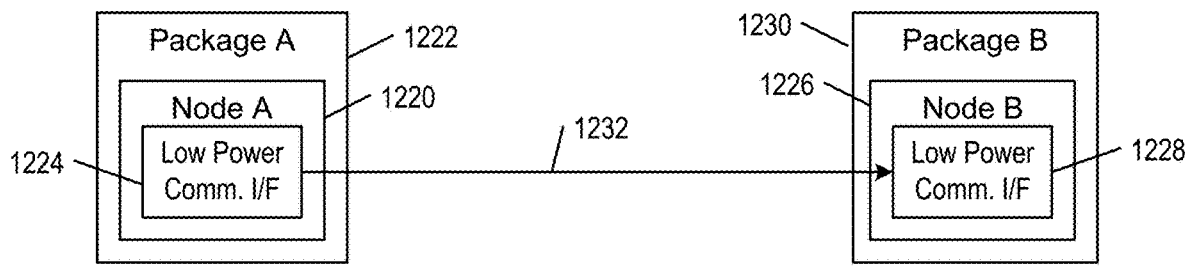
FIGS. 12A and 12B show example communications between tape nodes attached to packages, in embodiments.

Referring to FIG. 12A, a node 1220 (Node A) is associated with a package 1222 (Package A). In some embodiments, the node 1220 may be implemented as a tape node that is used to seal the package 1222 or it may be implemented as a label node that is used to label the package 1222; alternatively, the node 1220 may be implemented as a non-tape node that is inserted within the package 1222 or embedded in or otherwise attached to the interior or exterior of the package 1222. In the illustrated embodiment, the node 1220 includes a low-power communication-interface 1224 (e.g., a Bluetooth Low Energy communication-interface). Another node 1226 (Node B), which is associated with another package 1230 (Package B), is similarly equipped with a compatible low-power communication-interface 1228 (e.g., a Bluetooth Low Energy communication-interface).

In an example scenario, in accordance with the programmatic code stored in its memory, node 1226 (Node B) requires a connection to node 1220 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1220 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1232 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 12B:
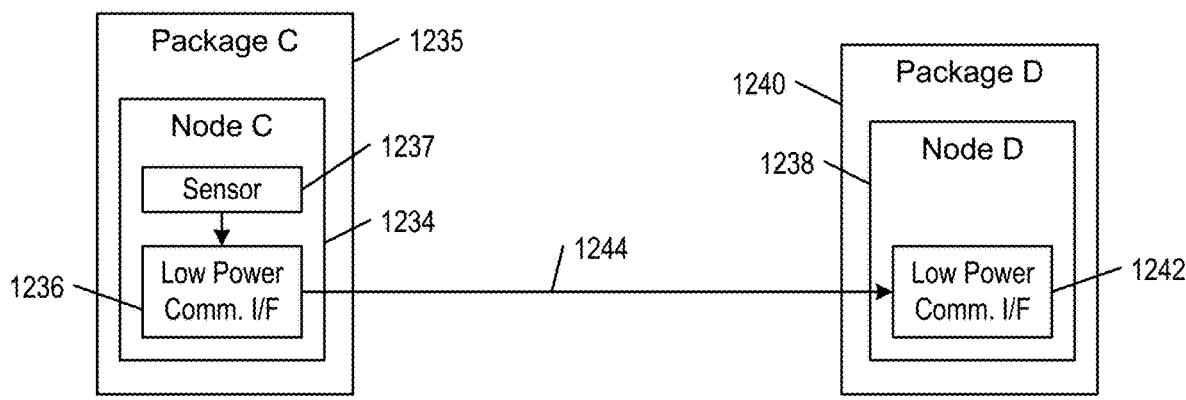

Referring to FIG. 12B, a node 1234 (Node C) is associated with a package 1235 (Package C). In the illustrated embodiment, the Node C includes a low-power communication-interface 1236 (e.g., a Bluetooth Low Energy communication-interface), and a sensor 1237 (e.g., a temperature sensor). Another node 1238 (Node D), which is associated with another package 1240 (Package D), is similarly equipped with a compatible low-power communication-interface 1242 (e.g., a Bluetooth Low-Energy communication-interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1244 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 12C:
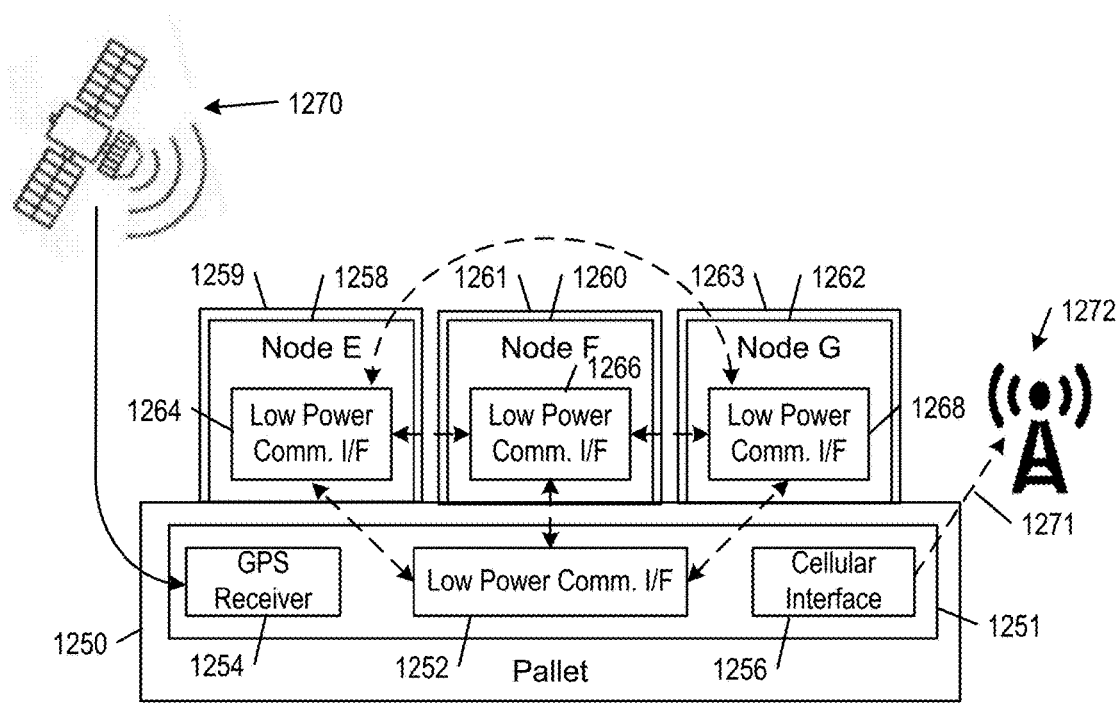
FIG. 12C shows example communication between a master node associated with a pallet and a plurality of other tape nodes associated with packages on the pallet, in embodiments.

Referring to FIG. 12C, a pallet 1250 is associated with a master node 1251 that includes a low-power communication-interface 1252, a GPS receiver 1254, and a cellular communication-interface 1256. In some embodiments, the master node 1251 may be implemented as a tape node or a label node that is adhered to the pallet 1250. In other embodiments, the master node 1251 may be implemented as a non-tape node that is inserted within the body of the pallet 1250 or embedded in or otherwise attached to the interior or exterior of the pallet 1250.

The pallet 1250 provides a structure for grouping and containing packages 1259, 1261, 1263 each of which is associated with a respective peripheral node 1258, 1260, 1262 (Node E, Node F, and Node G). Each of the peripheral nodes 1258, 1260, 1262 includes a respective low-power communication-interface 1264, 1266, 1268 (e.g., Bluetooth Low Energy communication-interface). In the illustrated embodiment, each of the nodes E, F, G, and the master node 1251 are connected to each of the other nodes over a respective low-power communications path (shown by dashed lines).

In some embodiments, the packages 1259, 1261, 1263 are grouped together because they are related. For example, the packages 1259, 1261, 1263 may share the same shipping itinerary or a portion thereof. In an example scenario, the master pallet node 1251 scans for advertising packets that are broadcasted from the peripheral nodes 1258, 1260, 1262. In some examples, the peripheral nodes broadcast advertising packets during respective scheduled broadcast intervals. The master node 1251 can determine the presence of the packages 1259, 1261, 1263 in the vicinity of the pallet 1250 based on receipt of one or more advertising packets from each of the nodes E, F, and G. In some embodiments, in response to receipt of advertising packets broadcasted by the peripheral nodes 1258, 1260, 1262, the master node 1251 transmits respective requests to the server to associate the master node 1251 and the respective peripheral nodes 1258, 1260, 1262. In some examples, the master tape node requests authorization from the server to associate the master tape node and the peripheral tape nodes. If the corresponding packages 1259, 1261, 1263 are intended to be grouped together (e.g., they share the same itinerary or certain segments of the same itinerary), the server authorizes the master node 1251 to associate the peripheral nodes 1258, 1260, 1262 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1251 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1258, 1260, 1262 include environmental sensors for obtaining information regarding environmental conditions in the vicinity of the associated packages 1259, 1261, 1263. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1251 can determine its own location based on geolocation data transmitted by a satellite-based radio navigation system 1270 (e.g., GPS, GLONASS, and NAVSTAR) and received by the GPS receiver 1254 component of the master node 1251. In an alternative embodiment, the location of the master pallet node 1251 can be determined using cellular based navigation techniques that use mobile communication technologies (e.g., GSM, GPRS, CDMA, etc.) to implement one or more cell-based localization techniques. After the master node 1251 has ascertained its location, the distance of each of the packages 1259, 1261, 1263 from the master node 1251 can be estimated based on the average signal strength of the advertising packets that the master node 1251 receives from the respective peripheral node. The master node 1251 can then transmit its own location and the locations of the package nodes E, F, and G to a server over a cellular interface connection with a cellular network 1272. Other methods of determining the distance of each of the packages 1259, 1261, 1263 from the master node 1251, such as Received Signal-Strength Index (RSSI) based indoor localization techniques, also may be used.

In some embodiments, after determining its own location and the locations of the peripheral nodes, the master node 1251 reports the location data and the collected and optionally processed (e.g., either by the peripheral nodes peripheral nodes 1258, 1260, 1262 or the master node 1251) sensor data to a server over a cellular communication path 1271 on a cellular network 1272.

In some examples, nodes are able to autonomously detect logistics execution errors if packages that are supposed to travel together no longer travel together and raise an alert. For example, a node (e.g., the master node 1251 or one of the peripheral nodes 1258, 1260, 1262) alerts the server when the node determines that a particular package 1259 is being or has already been improperly separated from the group of packages. The node may determine that there has been an improper separation of the particular package 1259 in a variety of ways. For example, the associated peripheral node 1258 that is bound to the particular package 1259 may include an accelerometer that generates a signal in response to movement of the package from the pallet. In accordance with its intelligent agent program code, the associated peripheral node 1258 determines that the master node 1251 has not disassociated the particular package 1259 from the group and therefore broadcasts advertising packets to the master node, which causes the master node 1251 to monitor the average signal strength of the advertising packets and, if the master node 1251 determines that the signal strength is decreasing over time, the master node 1251 will issue an alert either locally (e.g., through a speaker component of the master node 1251) or to the server.

Figure 13:
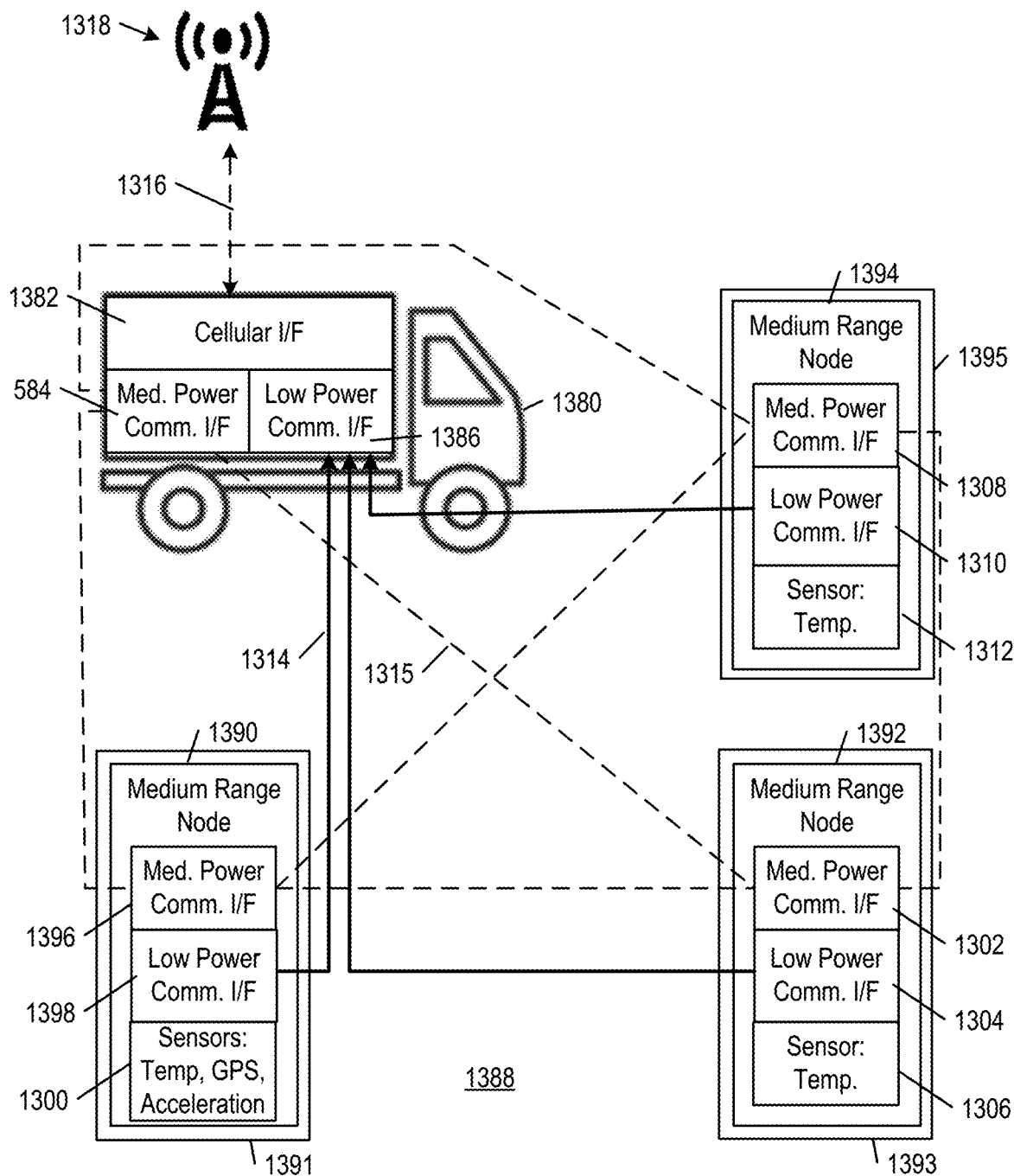
FIG. 13 shows a truck configured as a mobile node or mobile hub that includes a cellular communication-interface, a medium-power communication-interface, and a low-power communication-interface, in embodiments.

Referring to FIG. 13, a truck 1380 is configured as a mobile node or mobile hub that includes a cellular communication-interface 1382, a medium-power communication-interface 1384, and a low-power communication-interface 1386. The communication-interfaces 1380-1386 may be implemented on one or more tape and non-tape nodes. In an illustrative scenario, the truck 1380 visits a logistic storage facility, such as a warehouse 1388, to wirelessly obtain temperature data generated by temperature sensors in the medium range nodes 1390, 1392, 1394. The warehouse 1388 contains nodes 1390, 1392, and 1394 that are associated with respective logistic containers 1391, 1393, 1395. In the illustrated embodiment, each node 1390-1394 is a medium range node that includes a respective medium-power communication-interface 1396, 1302, 1308, a respective low-power communication-interface 1398, 1304, 1310 and one or more respective sensors 1300, 1306, 1312. In the illustrated embodiment, each of the package nodes 1390, 1392, 1394 and the truck 1380 is connected to each of the other ones of the package nodes through a respective medium-power communications path (shown by dashed lines). In some embodiments, the medium-power communications paths are LoRa formatted communication paths.

In some embodiments, the communication-interfaces 1384 and 1386 (e.g., a LoRa communication-interface and a Bluetooth Low Energy communication-interface) on the node on the truck 1380 is programmed to broadcast advertisement packets to establish connections with other network nodes within range of the truck node. A warehouse 1388 includes medium range nodes 1390, 1392, 1394 that are associated with respective logistic containers 1391, 1393, 1395 (e.g., packages, boxes, pallets, and the like). When the truck node's low-power interface 1386 is within range of any of the medium range nodes 1390, 1392, 1394 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1390, 1392, 1394, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1314 or a LoRa formatted communication path 1317), the truck node determines the identity information for the medium range node 1390 (e.g., a peripheral node), the medium range node's capabilities include retrieving temperature data, and the medium range node's services include transmitting temperature data to other nodes. Depending of the size of the warehouse 1388, the truck 1380 initially may communicate with the nodes 1390, 1392, 1394 using a low-power communication-interface (e.g., Bluetooth Low Energy interface). If any of the anticipated nodes fails to respond to repeated broadcasts of advertising packets by the truck 1380, the truck 1380 will try to communicate with the non-responsive nodes using a medium-power communication-interface (e.g., LoRa interface). In response to a request from the medium-power communication interface 1384, the medium range node 1390 transmits an indication of its measured temperature data to the truck node. The truck node repeats the process for each of the other medium range nodes 1392, 1394 that generate temperature measurement data in the warehouse 1388. The truck node reports the collected (and optionally processed, either by the medium range nodes 1390, 1392, 1394 or the truck node) temperature data to a server over a cellular communication path 1316 with a cellular network 1318.

Figure 14:
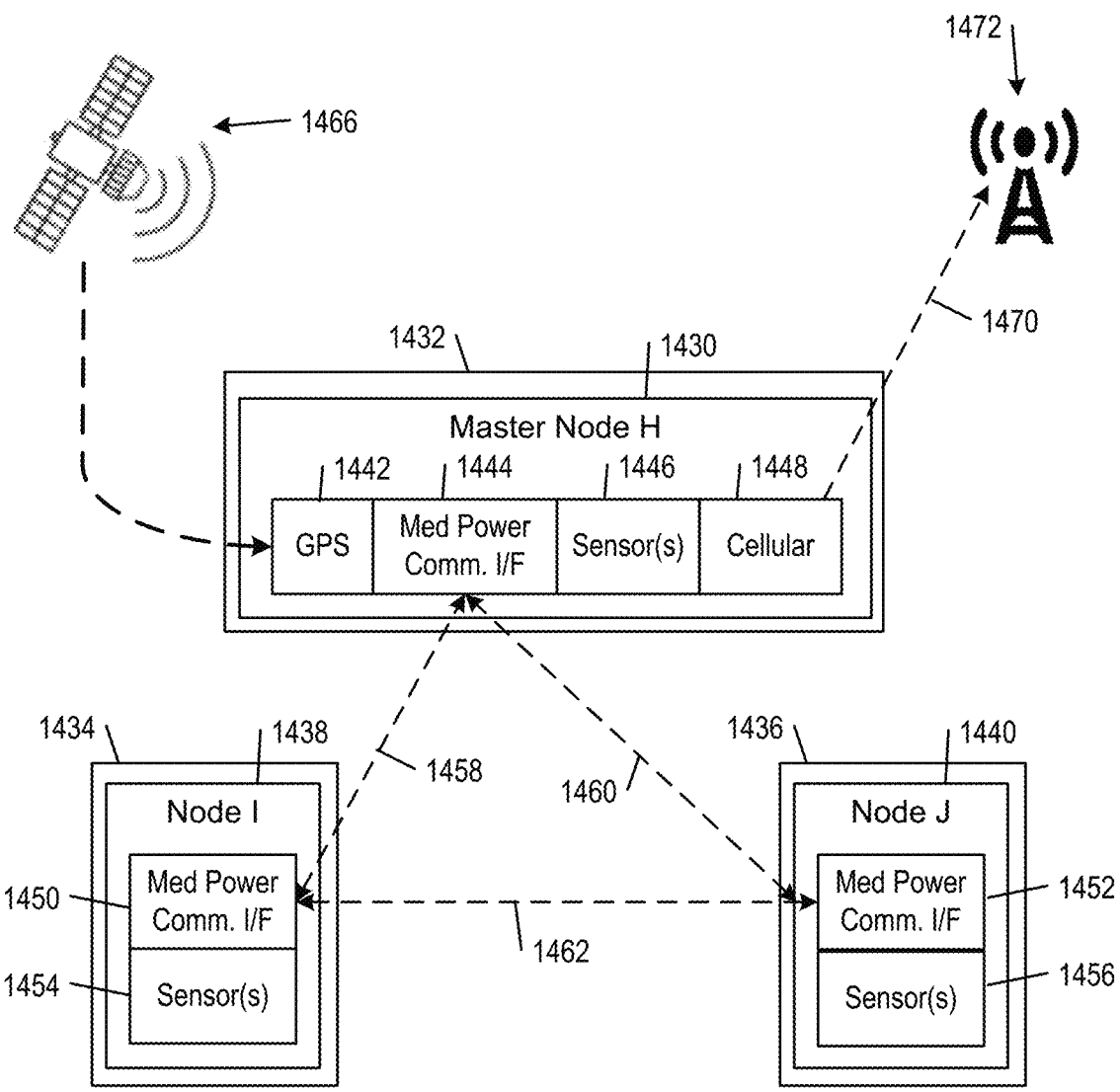
FIG. 14 shows a master node associated with a logistic item grouped together with other logistic items that are associated with respective peripheral nodes, in embodiments.

Referring to FIG. 14, a master node 1430 is associated with a logistic item 1432 (e.g., a package) and grouped together with other logistic items 1434, 1436 (e.g., packages) that are associated with respective peripheral nodes 1438, 1440. The master node 1430 includes a GPS receiver 1442, a medium-power communication-interface 1444, one or more sensors 1446, and a cellular communication-interface 1448. Each of the peripheral nodes 1438, 1440 includes a respective medium-power communication-interface 1450, 1452 and one or more respective sensors 1454, 1456. In the illustrated embodiment, the peripheral and master nodes are connected to one another other over respective pairwise communications paths (shown by dashed lines). In some embodiments, the nodes 1430, 1438, 1440 communicate through respective LoRa communication-interfaces over LoRa formatted communications paths 1458, 1460, 1462.

In the illustrated embodiment, the master and peripheral nodes 1430, 1438, 1440 include environmental sensors for obtaining information regarding environmental conditions in the vicinity of the associated logistic items 1432, 1434, 1436. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1430 periodically broadcasts advertising packets in the surrounding area. When the peripheral nodes 1438, 1440 are within range of master node 1430, and are operating in a listening mode, the peripheral nodes 1438, 1440 will extract the address of master node 1430 and potentially other information (e.g., security information) from the advertising packets. If, according to their respective programmatic code, the peripheral nodes 1438, 1440 determine that they are authorized to connect to the master node 1430, the peripheral nodes 1438, 1440 will attempt to pair with the master node 1430. In this process, the peripheral nodes 1438, 1440 and the master node 1430 determine each other's identities, capabilities, and services. For example, after successfully establishing a respective communication path 1458, 1460 with each of the peripheral nodes 1438, 1440 (e.g., a LoRa formatted communication path), the master node 1430 determines certain information about the peripheral nodes 1438, 1440, such as their identity information (e.g., peripheral nodes), their capabilities (e.g., measuring temperature data), and their services include transmitting temperature data to other nodes.

After establishing LoRa formatted communications paths 1458, 1460 with the peripheral nodes 1438, 1440, the master node 1430 transmits requests for the peripheral nodes 1438, 1440 to transmit their measured and/or locally processed temperature data to the master node 1430.

In the illustrated embodiment, the master node 1430 can determine its own location based on geolocation data transmitted by a satellite-based radio navigation system 1466 (e.g., GPS, GLONASS, and NAVSTAR) and received by the GPS receiver 1442 component of the master node 1430. In an alternative embodiment, the location of the master node 1430 can be determined using cellular based navigation techniques that use mobile communication technologies (e.g., GSM, GPRS, CDMA, etc.) to implement one or more cell-based localization techniques. After the master node 1430 has ascertained its location, the distance of each of the logistic items 1434, 1436 from the master node 1430 can be estimated based on the average signal strength of the advertising packets that the master node 1430 receives from the respective peripheral node. The master node 1430 can then transmit its own location and the locations of the package nodes H, J, and I to a server over a cellular interface connection with a cellular network 1472. Other methods of determining the distance of each of the logistic items 1434, 1436 from the master node 1430, such as Received Signal-Strength Index (RSSI) based indoor localization techniques, also may be used.

In some embodiments, after determining its own location and the locations of the peripheral nodes, the master node 1430 reports the location data, the collected and optionally processed (e.g., either by the peripheral nodes peripheral nodes 1438, 1440 or the master node 1430) sensor data to a server over a cellular communication path 1470 on a cellular network 1472.

Depleting Battery at an End of a Products Useful Life

When a non-depleted battery is short-circuited, there is a possibility of harm (e.g., fire, chemical leakage, etc.). It is therefore preferable that a battery of an adhesive tape platform (e.g., a tape node, a tape agent, an IOT device, etc.) be exhausted prior to disposal to avoid potential harm that may result from short-circuit of the battery.

In many applications, adhesive tape platforms, tape nodes, IoT devices, and other similar electronic devices, reach an end of useful life when a particular event occurs. This is different from other types of electronic device that end their lives when their batteries or other energy storage components are depleted. The following examples use the tracking system implemented by the network communications environment 900 of FIG. 9, and FIG. 9 may be viewed together with the following description and FIGS. 15A-15D. As shown in FIG. 9, the tape node 918 is attached to the asset 920, whereby the arrival of the asset 920 at its destination location indicates an end to the useful life of the tape node 918. That is, the tape node 918 is no longer needed once the asset reaches its final destination, even though the tape node 918 may have battery power remaining and be operational. For example, as the package is opened to access the asset, the tape node 918 may be removed for disposal. The tape node 918 is operational when it arrives at the final destination location of the asset and its battery is not depleted. Thus, the non-depleted battery of the tape node 918 may present a risk during disposal. Advantageously, the present embodiments solve this problem by the tape node determining when its useful life ends and automatically draining remaining power from the battery to prepare the tape node 918 for safe disposal.

Figure 15A:
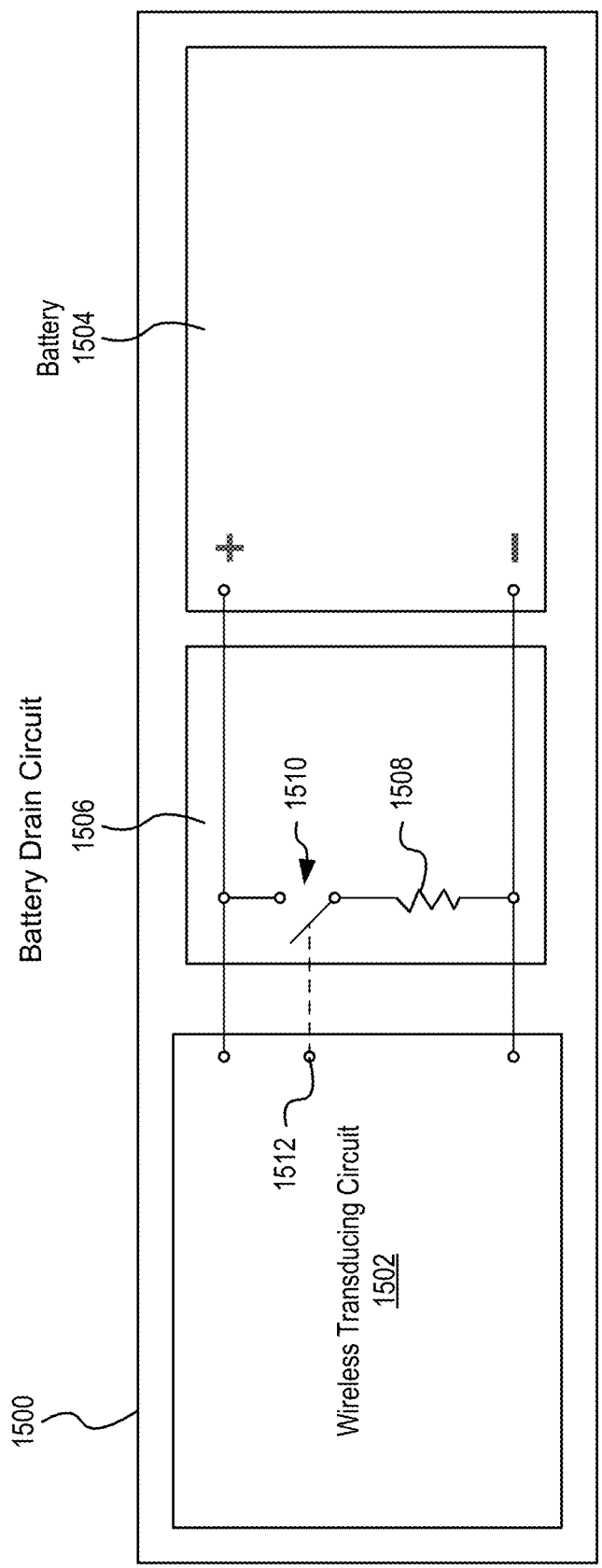
FIG. 15A is a schematic diagram illustrating one example adhesive tape platform with a wireless transducing circuit and a battery drain circuit, in embodiments.

FIG. 15A is a schematic diagram illustrating one example adhesive tape platform 1500 with a wireless transducing circuit 1502, a battery 1504, and a battery drain circuit 1506. The adhesive tape platform 1500 may represent the adhesive tape platform 112 of FIG. 1, the tape node 918 of FIG. 9, or any of the tape nodes, tape agents, or adhesive tape platforms described above. The battery 1504 is electrically coupled with the wireless transducing circuit 1502, and the battery drain circuitry 1506 is coupled in parallel therewith. In the example of FIG. 15A, the battery drain circuit 1506 includes a resistor 1508 in series with a normally open switch 1510 (e.g., an electronic switch or a multiplexer). The battery drain circuit 1506 is connected in parallel with the battery 1504 (e.g., connected directly across the battery output) and the wireless transducing circuit 1502. The switch 1510 is controlled by an output 1512 of the wireless transducing circuit 1502. The wireless transducing circuit 1502 activates the output 1512 to close the switch 1510 at the end of the useful life of the adhesive tape platform 1500, whereby the battery drain circuit 1506 draws current through the resistor 1508 to drain any remaining power from the battery 1504.

The battery drain circuit 1506 may include other circuit elements to control the current drawn from the battery 1504, the load presented across the battery 1504, heat dissipation by the battery drain circuit 1506, and other aspects of the battery drain circuit 1506 to successfully and safely drain remaining power from the battery 1504.

Detecting End of Life Event

Figure 15B:
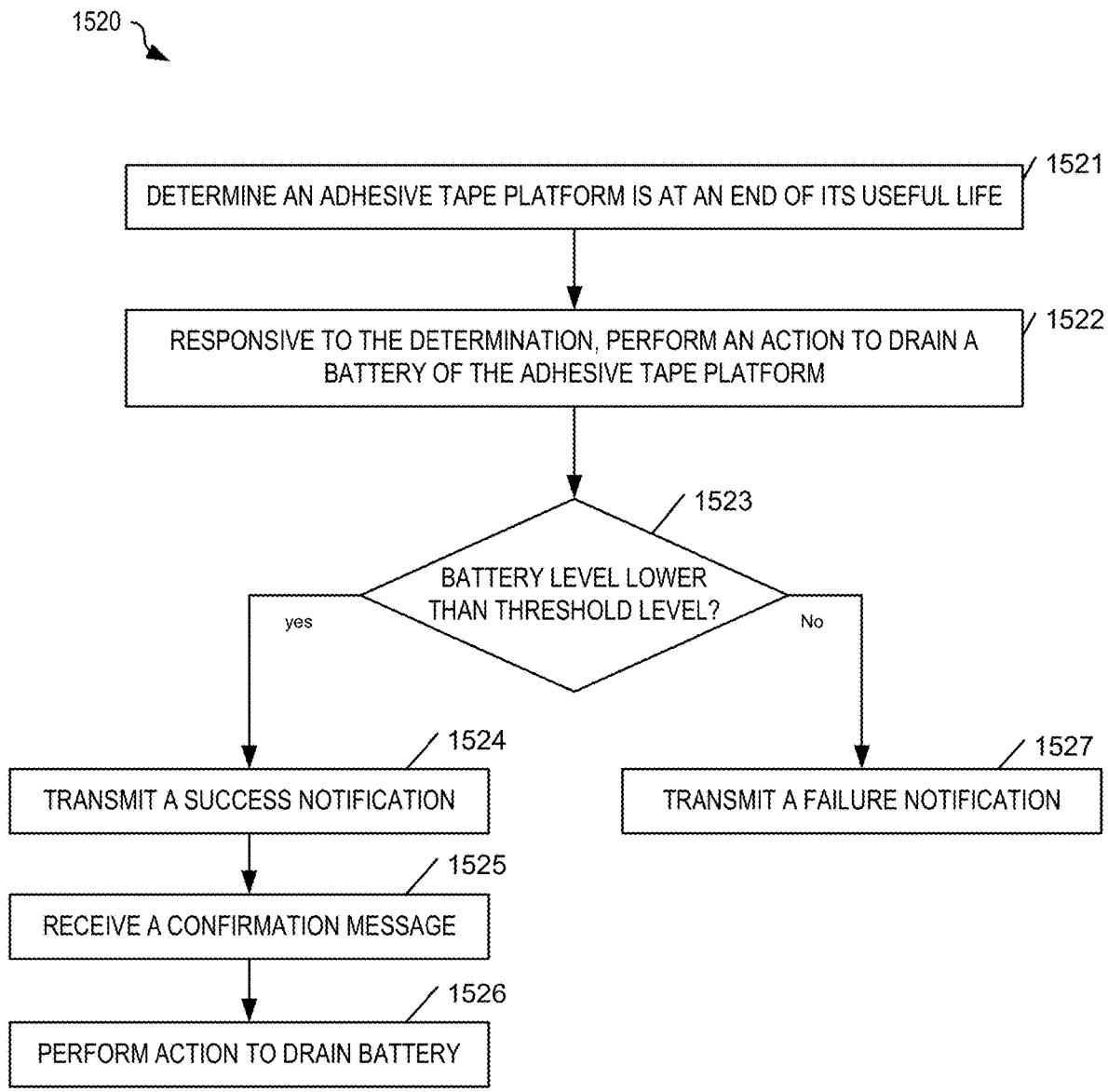
FIG. 15B is a flowchart illustrating one example method for depleting a battery of an adhesive tape platform at the end of its useful life such that the adhesive tape platform is safe for disposal, in embodiments.

FIG. 15B is a flowchart illustrating one example method 1520 for depleting a battery of an adhesive tape platform (e.g., the adhesive tape platform 112 of FIG. 1, the tape node 918 of FIG. 9, the adhesive tape platform 1500, FIG. 15A, or any of the tape nodes or tape agents described above) at the end of the useful life of the adhesive tape platform such that the adhesive tape platform is safe for disposal.

In block 1521, an adhesive tape platform determines it is at an end of its useful life. In one example of block 1521, tape node 918 determines that its current location is a final destination of the asset 920. In another example of block 1521, the tape node 918 communicates with at least one of gateway 914 and server 904 of the IOT system (e.g., a tracking system as shown by network communications environment 900, a sensing system, etc.) and receives a notification that the current location is a final destination (e.g., by receiving GPS coordinates corresponding to a final destination of a respective asset). In another example of block 1521, the tape node 918 communicates with at least one of gateway 914 and server 904 of the IOT system and receives an instruction to drain remaining battery life. In another example of block 1521, the adhesive tape platform is scanned by client device 910 and receives a notification (e.g., a message) from the client device indicating that it is no longer in use (e.g., that it has reached the end of its useful life).

In another example of block 1521, the tape node 918 determines, from receiving local wireless communications, that it is no longer in use when the number of other tape nodes nearby exceeds a threshold value (e.g., one hundred, one thousand, etc.), such as occurs when the tape node is within a disposal area with other tape nodes. In another example of block 1521, the tape node 918 receives local wireless communications from other nearby tape nodes indicating successful (or unsuccessful) battery drain, thereby indicating that it is in a disposal area. In another example of block 1521, the tape node 918 fails to communicate with other entities of the IOT system for a period greater than a threshold period (e.g., 24 hours, one week, etc.) and thereby determines that it is no longer in use by the IOT system.

In another example of block 1521, the tape node 918 includes one or more sensors and determines, based on sensor data from the one or more sensors, that it is at an end of its useful life. For example, when the tape node 918 includes a temperature sensor and is associated with a cold chain asset (e.g., where the asset is kept cold by dry ice or other means and is monitored by the adhesive tape platform, such as when shipping frozen food products or medicines), sensor data corresponding to a higher temperature (e.g., ambient or room temperature) for a period greater than a threshold period (e.g., 1 hour) causes the tape node to determine that it is no longer in use, since it is removed from the asset. When the tape node 918 includes a temperature sensor and the sensor data indicates a temperature higher than a range expected during normal operation of the tape node, such as when the tape node is in an incinerator, the tape node 918 determines that is at the end of its useful life (e.g., no longer in use).

In another example of block 1521, the tape node 918 includes a vibration sensor and/or accelerometer, and determines that it is at the end of its useful life when the sensor data from the vibration sensor indicates that the adhesive tape platform is being quickly shaken or repetitively moved. In another example, the sensor data matches at least one signature indicative of the tape node 918 being removed from an asset, being placed in machinery for disposal, or any other type of movement by a user of the tape node 918 that is indicative that the tape node 918 is no longer in use. The tape node 918 may use different, additional, and/or a combination of methods to determine an end of its useful life.

In block 1522, responsive to the determination of block 1521, the adhesive tape platform performs one or more actions to drain a battery of the adhesive tape platform. In one example of block 1522, the tape node 918 includes battery drain circuitry 1506 (FIG. 15A) that is activated by a control 1512 from the wireless transducing circuit 1502 to drain power from the battery when the end-of-life is determined. In another embodiment, the processor controls a resistor to affect chemistry of the battery and/or its functionality to drain power from the battery. For example, the battery may have a heat sensitive component that disables the battery is response to heat, whereby current is switched through a resistor (e.g., a heating element), located near the heat sensitive component, that is heated above a threshold level to trigger a reaction in the heat sensitive component that deactivates the battery. In one embodiment, the heat sensitive element is a thermal fuse, thermal switch, and/or an anti-fuse. In another embodiment, heat from a resistor switched into circuit with the battery may apply heat do degrade one or more heat sensitive components of the battery.

In another example of block 1522, the tape node 918 is configured to remove parts of the battery or a battery circuit responsive to detecting the end of its useful life, thereby removing functionality of the battery. In certain embodiments, the adhesive tape platform removes electrodes of the battery in response to detecting the end of its useful life. For example, the tape node 918 may include a mechanical switch or lever that mechanically withdraws one or more components (e.g., electrodes) of the battery. In another example, the tape node 918 may include a mechanical switch or lever that physically disconnects the circuit coupling to the battery; in certain embodiment, this is done when the battery is below a threshold level. In another example, the electrodes and/or contacts of the battery are heat sensitive, whereby a resistor is connected in circuit with the battery to generate heat that degrades and/or breaks down the contacts or electrodes to render the battery inoperative. In another example, the battery contacts are connected to a fuse, whereby the wireless transducing circuit activates a switch that draw excessive current through the fuse causing it to break and permanently disconnect the battery. In other embodiments, the tape node 918 includes a fuse/antifuse circuit that is controllable by the processor to drain power from the battery when the end of its useful life is detected. In another embodiment, the tape node 918 is operable to input air into the battery to affect chemical functions of the battery when the end of its useful life is detected. For example, the battery may have components that are sensitive to air, which causes them to degrade. In one example, the user removes a flap that allows air to reach and disable the battery. In another example, an enclosure of the battery includes a shutter that is controlled to open by the wireless transducing circuit when the adhesive tape platform reaches the end of its useful life. In another example, the wireless transducing circuit activates a component (e.g., a needle coupled with a small rotor or motor) that punctures a hermetic seal of the battery enclosure.

In another example of block 1522, the tape node 918 activates at least one function with high-power usage to drain power from the battery in response to detecting the end of its useful life. For example, the tape node 918 transmits data at short intervals (e.g., every 10 ms), and/or makes a cellular connection, using a wireless communication interface (e.g., one or more of low-power communication interface 652, medium-power communication interface 672', and high-power communication interface 682" of FIGS. 6A-6C) that has high battery use. In another example of block 1522, the tape node 918 captures sensor data at high-frequency (e.g., every 10 ms). In another example of block 1522, the tape node 918 makes cellular, Bluetooth, and/or other communication connections at a high frequency (e.g., every 1 s). In certain embodiments, the adhesive tape platform may perform a combination of the above functionalities, and/or different functionalities than those described above, to drain power from the battery.

Block 1523 is a decision. In block 1523, the adhesive tape platform performs one or more battery level (e.g., voltage, voltage and current) checks to determine if the level of the battery is below a threshold level. Because of risks associated with unsafe disposal of batteries that are not depleted, it is valuable to confirm that the battery of the adhesive tape platform is successfully drained prior to disposal. When, in block 1523, the adhesive tape platform determines that the determined battery level is lower than the threshold level (e.g., a level indicating little power remains in the battery), the method 1520 stops the action of block 1522 (e.g., stops intentionally draining its battery) and continues with block 1524. For example, the threshold level may be set such that the remaining power within the battery is not hazardous and such that the operation of the tape node 918 drains the remaining power over a short period. In some embodiments, the threshold level may be a level such that the remaining battery power allows for the tape node to perform one or more operations (e.g., the operation performed in blocks 1524, 1525, and/or 1526) before total depletion.

In block 1524, the adhesive tape platform transmits a battery drain success notification to one or more of a client device, a server, the cloud, a gateway device, or other infrastructure and/or entity of the sensing system. In one example of block 1524, the tape node 918 sends a notification message to the mobile gateway 912 to indicate successful drain of its battery. The success notification confirms that the adhesive tape platform has successfully drained its battery to a level that is safe for disposal. In certain embodiments, the adhesive tape platform may, at intervals, repeat block 1524 until the battery is completely drained.

Blocks 1525 and 1526 are optional. If included, in block 1525, the adhesive tape platform receives a confirmation message (e.g., from one or more of the client device, the server, the cloud, the gateway device, or other infrastructure and/or entity of the sensing system) indicating that its status is noted/logged. In one example of block 1525, tape node 918 receives a confirmation message from mobile gateway 912. In block 1526, in response to receiving the conformation message, the adhesive tape platform performs an action to drain the battery. In one example of block 1526, the tape node 918 performs the same, or different, action as performed in block 1522 to continue draining its battery until it is completely discharged. The success notification of block 1524 allows a server (e.g., server 904 of the tracking system 900) to log the safe disposal condition of the adhesive tape platform, and the confirmation message of block 1525 allows the adhesive tape platform to finish draining the battery where safety regulations so dictate.

When, in block 1523, the adhesive tape platform determines that the measured battery level is not below the threshold level after a predefined amount of time, the method 1520 continues with block 1527. In block 1527, the adhesive tape platform transmits a failure notification to one or more of the client device, the server, the cloud, the gateway, and/or the other infrastructure or entity of the sensing system. The failure notification alerts the IOT system (e.g., an authorized user of the tracking system) that the adhesive tape platform has failed to drain the battery sufficiently, and that additional time may be required to drain the battery prior to safe disposal. In one example, the IOT system may present the notification on a client device to inform a person intending to dispose of the adhesive tape platform that it requires an additional thirty minutes to drain it battery, or that it could not drain its battery and therefore needs careful handling and disposal. Accordingly, the tape node 918 may repeat blocks 1522 and 1523 for another predefined amount of time in an attempt to drain it battery. In another example of block 1527, the failure notification transmitted in block 1527 and/or the notification presented on the client device may provide identifying details that allow a person emptying a disposal bin containing the tape node, to search for and find the tape node (e.g., by wirelessly interacting and tracking the tape node 918) for special handling. In certain embodiments, the IOT system includes a user interface or user application that presents a map for locating the adhesive tape platform.

In certain embodiments, the tape node 918 sends a notification to a nearby by client device to instruct a user to drain the battery of the tape node by manual interaction. For example, the tape node 918 may transmit a wireless message, via its low-power communication interface 652 (e.g., using Bluetooth or other short range direct wireless communication), to nearby client devices (e.g., client device 910 running client application 922), whereby the notification instructs the user to find and disable the tape node 918. For example, the client application 922, when triggered by the notification, may provide instructions for the user to drain and/or remove the battery from the tape node 918. For example the client application 922 may output one or more of text, pictures, and audio that instruct the user to take one or more actions that drain or degrade the battery of the tape node 918. The client application 922 may output one or more of text, pictures, and audio that instruct the user to cut the battery from the tape node. For example, instructions may include one or more actions such as cutting, tearing, or bending the tape node 918 at a specified location (e.g., as indicated by a graphic or cut line on the tape node). In certain embodiments, the tape node 918 includes a drain-circuit that is activated in a manner similar to the wake circuit of FIGS. 7A and 7B. That is, the user is instructed to cut along a deactivation-line of the tape node 918, which activates a battery drain circuit (e.g., similar to battery drain circuit 1506 of FIG. 15A).

In another example, the client application 922 may instruct the user to apply pressure to a pressure-sensitive location on the tape node 918. For example, the pressure-sensitive location may correspond to a physical button or switch that activates the battery drain circuit. In another example, applying pressure to the pressure-sensitive location permanently breaks a mechanical circuit coupling the battery to the wireless transducer circuit. In another example, applying pressure to the pressure-sensitive location permanently breaks a barrier to allow a chemical to mix with one or more of the battery components to deactivate the battery (e.g., deactivation by chemical treatment).

In another example, the client application 922 may instruct the user to remove a protective cover portion of the tape node 918 to expose air sensitive battery materials to air to cause them to degrade and disable the battery.

Matching Battery Drain to Expected Life of Adhesive Tape Platform

In certain embodiments, the adhesive tape platform (e.g., the adhesive tape platform 112 of FIG. 1, tape nodes, tape agents, etc. as described above) is aware of its own life expectancy based upon its assigned task. Continuing with the example of FIGS. 9 and 15B, where the tape node 918 is used to track the asset 920, the tape node 918 may determine its expected activity and useful life time corresponding to the intended transport of the asset.

Figure 15C:
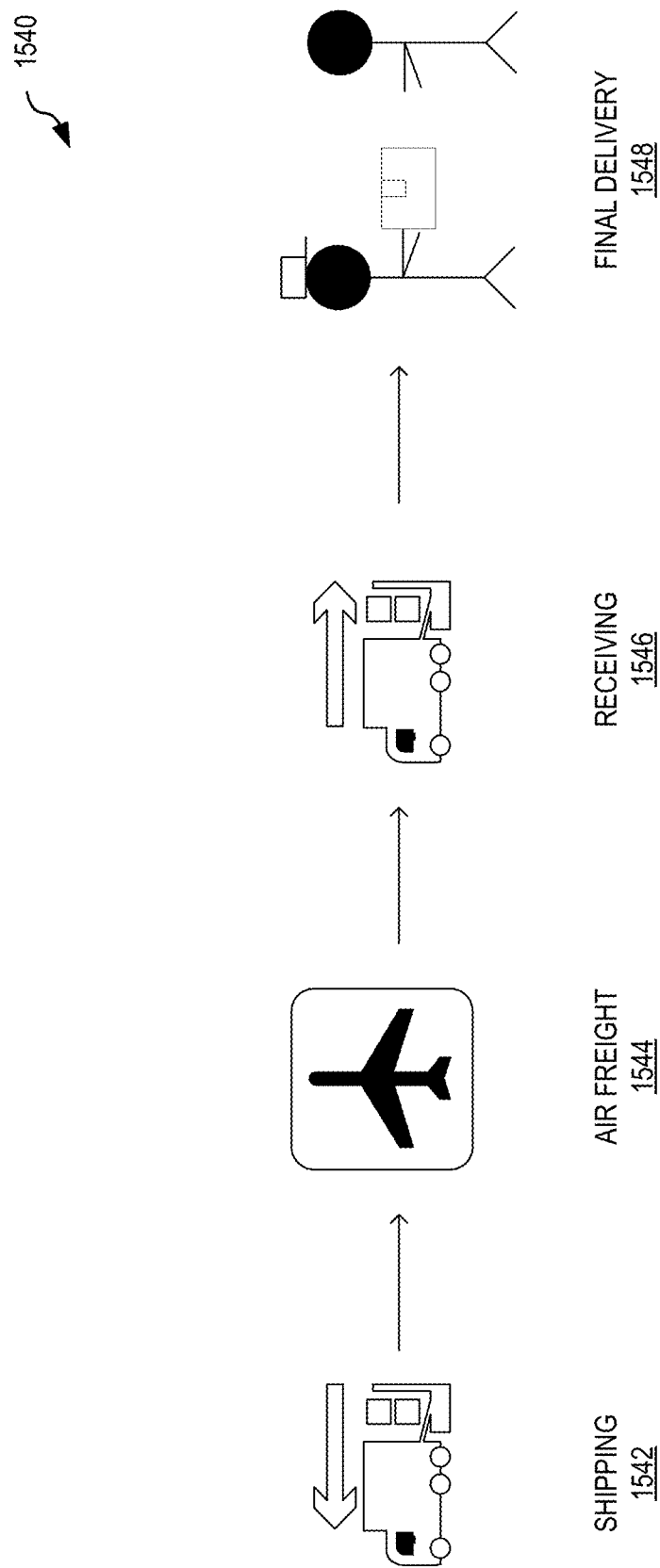
FIG. 15C is a diagram showing example freight phases for assets tracked using a tracking system and adhesive tape platforms, in embodiments.

FIG. 15C is a diagram showing example freight phases 1530 for assets tracked using a tracking system (e.g., the network communications environment 900 of FIG. 9, hereafter referred to as tacking system 900), where each asset (e.g., assets 920, 930, 934, 950, 952, 924 and 956) has a corresponding adhesive tape platform (e.g., tape node 918, 928, 932, 942, 944, 946, and 948, respectively) that may include one or more segments of the adhesive tape platform (e.g., adhesive tape platform 112 of FIG. 1, adhesive tape platform 330 of FIG. 3, and so on). The freight phases 1530 include a shipping phase 1532 from an origin location, an air freight phase 1534, a receiving phase 1536 at an intermediary location, and a final delivery phase 1538 to a customer at a destination. The freight phases 1530 may include different phases than shown in FIG. 15C, including a different number and/or order of phases. The tracking system 900 may include rules and expectations relevant to the asset and the corresponding adhesive tape platform during and between each of the freight phases 1530, according to some embodiments. For example, the tracking system 900 may include rules that require the tape node to limit its wireless communication during the air freight phase 1534 to comply with air safety regulations. As another example, the tracking system 900 may include rules that require the tape node to limit its wireless communication during the air freight phase 1534 to conform to FAA requirements and to preserve battery power. In another example, the tracking system 900 may include rules that instruct the tape node to increase the fidelity of its tracking data during a final leg of the shipment. This final leg of shipment may occur, for example, between the air freight phase 1534 and the receiving phase 1536 or between the receiving phase 1536 and the final delivery phase 1538.

The shipping phase 1532 includes the beginning of the shipment up to the arrival at an intermediary location. In some embodiments, a tape node is installed on the asset approximately at the time of the shipping phase 1532 at the origin location. In other embodiments, the tape node is installed on the asset at an earlier time (e.g., at a time of manufacturing or packaging). The shipping phase 1532 may include ground shipment of the asset from the origin location to a number of intermediary locations. The shipping phase 1532 may include times where the asset is handled by delivery employees, stored in a shipping center, traveling aboard a vehicle, and arrives at an intermediary location. In other embodiments, the freight phases 1530 only include the shipping phase 1532 and the final delivery phase 1538. For example, this may be the case when the asset is only being shipped a short distance. At the shipping phase 1532 the two-dimensional bar code on the tape node may be scanned by a client device (e.g., client device 910), in some embodiments. In further embodiments, the client device 910 may communicate with the server 904, in response to scanning the two-dimensional bar code. For example, the client device may notify the server that shipment of the asset has been initiated, and the server may log the event in its database 908 and take actions as needed. In some embodiments, a client device 910 may communicate directly with the tape node (e.g., using Bluetooth, Wi-Fi, wireless radio, near-field communication (NFC), or some other communication method) during the shipping phase 1532, instead of or in addition to scanning the two-dimensional bar code. In further embodiments, the client device may receive tracking data from the tape node in response and proceed to transmit that data to the server. The freight phases 1530 may include more than one shipping phase 1532 where the asset is ground shipped from one intermediary location to a subsequent intermediary location.

The air freight phase 1534 includes the delivery of the asset to a departure airport or air freight center up to the arrival of the asset at an arrival airport or air freight center. During the air freight phase 1534, the two-dimensional bar code (e.g., identifier 122) on the tape node may be scanned by a client device one or more times. For example, the two-dimensional bar code on the tape node may be scanned by a client device, by an airport employee, upon receiving the asset at the departure airport. The two-dimensional bar code may later be scanned by a client device upon loading the asset onto an airplane at the departure airport, unloading the asset from the airplane at the arrival airport, handling the asset at the arrival airport, and transferring the asset to ground shipping after landing at the arrival airport. Each time one of the client devices scans the two-dimensional bar code, the respective client device may communicate with the server 904. For example, the client device may notify the server 904 that air freight of the asset has been initiated, and the server 904 may log the event in its database 908 and take actions accordingly. In some embodiments, a client device may communicate directly with the tape node (e.g., using Bluetooth, Wi-Fi, wireless radio, near-field communication (NFC), or some other communication method) during the air freight phase 1534, instead of or in addition to scanning the two-dimensional bar code. In further embodiments, the client device 910 may receive tracking data from the tape node and, in response, transmit that data to the server 904. In other embodiments, the freight phases 1530 may include more than one air freight phase 1534 where the asset is carried on multiple airplane trips.

The receiving phase 1536 at an intermediary location includes the arrival of the asset at an intermediary location. The receiving phase 1536 may include times where the asset is handled by delivery employees, stored in a receiving center, and transferred to a vehicle or a person for final delivery to the final destination or customer. For example, the intermediary location may include a receiving center in a building which contains the final destination. In some embodiments, the freight phases 1530 only include the shipping phase 1532, the receiving phase 1536 and the final delivery phase 1538. For example, this may be the case when the asset is only delivered via ground shipping. At the receiving phase 1536 the two-dimensional bar code on the tape node may be scanned by a client device as described above in the shipping phase 1532, in some embodiments. In further embodiments, the client device 910 may communicate with the server 904, in response to scanning the two-dimensional bar code. For example, the client device 910 may notify the server 904 that the asset has arrived at the intermediary location, and the server 904 may log the event in its database 908 and take any needed actions. In some embodiments, a client device may communicate directly with the tape node (e.g., using Bluetooth, Wi-Fi, wireless radio, near-field communication (NFC), or some other communication method) during the receiving phase 1536, instead of or in addition to scanning the two-dimensional bar code. In further embodiments, the client device 910 may receive tracking data directly from the tape node in response and proceed to transmit that data to the server 904. The freight phases 1530 may include more than one receiving phase 1536 when the asset is ground shipped from one intermediary location to a subsequent intermediary location.

The final delivery phase 1538 includes the asset arriving at the destination. In some embodiments, the final delivery phase 1538 includes the final recipient (e.g., the customer) of the asset accepting and/or confirming the delivery of the asset. At the final delivery phase 1538, the two-dimensional bar code on the tape node may be scanned by a client device 910 as described above with respect to the shipping phase 1532 and the receiving phase 1536, in some embodiments. For example, the final delivery phase 1538 may include the final recipient signing for the asset and scanning the two-dimensional barcode on the tape node with a client device 910 to confirm the arrival of the asset. In another example, a delivery employee may leave the asset at a final location (e.g., the front door of a house) and scan the two-dimensional barcode on the tape node 1010 with a client device to indicate that the asset has been left at the final location. In further embodiments, the client device 9 may communicate with the server 904, in response to scanning the two-dimensional bar code. For example, the client device 1030 may notify the server 904 that the asset has been delivered, and the server 904 may log the event in its database 908 and take any needed actions. In some embodiments, a client device 910 may communicate directly with the tape node (e.g., using Bluetooth, Wi-Fi, wireless radio, near-field communication (NFC), or some other communication method) during the final delivery phase 1538, instead of or in addition to scanning the two-dimensional bar code. In further embodiments, the client device 910 may receive tracking data from the tape node in response and proceed to transmit that data to the server 904.

The tracking system 900 includes distributed intelligent software with rules and instructions that control the state of the tape nodes, the server 904, and the client devices for each of the freight phases 1530 and times in between the freight phases 1530, according to some embodiments. The distributed intelligent software instructs the tape node to enter different tape node states based on the rules and based on the tracking data collected by the tape node. The tape node states may include any combination of one or more of, but are not limited to, the following examples: a low-power mode where the tape node operates with minimal power consumption; a low-communication mode where the tape node limits the amount and/or frequency of transmitting and receiving data; a high-communication mode where the tape node increases the amount and/or frequency of transmitting and receiving data; an airplane mode where some of the wireless communication is deactivated based on air travel regulation; a high-fidelity location mode which increases the resolution and accuracy of location data that is collected and transmitted to the central database and control system (in some embodiments, this includes one or more of increasing the sampling frequency of location data and/or the frequency of transmitting the location data, activating a GPS module on the tape node and collecting GPS-based location data); a low-fidelity location mode which reduces the resolution and accuracy of location data that is collected and transmitted to the server 904 (in some embodiments, this includes decreasing the sampling frequency of location data and/or the frequency of transmitting the location data; in some embodiments, this includes deactivating a GPS module on the tape node and omitting GPS data in the tracking data); a sensing mode in which sensors included in the tape nodes collect data and transmit the sensor data to other components of the tracking system 900; a high sensing mode which increases the amount of sensor data collected and transmitted (in some embodiments, this includes increasing the sampling frequency of the sensors and frequency of transmitting the sensor data); a search mode where the tape node searches to communicate with a client device in proximity of the tape node; a heartbeat mode where the tape node intermittently transmits a signal to the server 904 to indicate normal functionality of the tape node; an alert mode where the tape node transmits an alert to one or more of the server 904, a client device 910 of a delivery employee (handler), a client device 910 of a customer, a client device 910 of a final recipient, and a client device 910 of an administrator; a data processing mode where the tape node calculates values (e.g., RMS values, peak values, spectral information, or other calculated values) based on collected tracking data and only transmits the calculated values; and full data mode where the tape node transmits all the tracking data that it collects.

The tape node states may include one or more additional states not listed above. The tape node may be in multiple tape node states simultaneously, according to some embodiments. For example, the tape node may be in both a high-fidelity of location mode and a high communication mode, as described above.

Figure 15D:
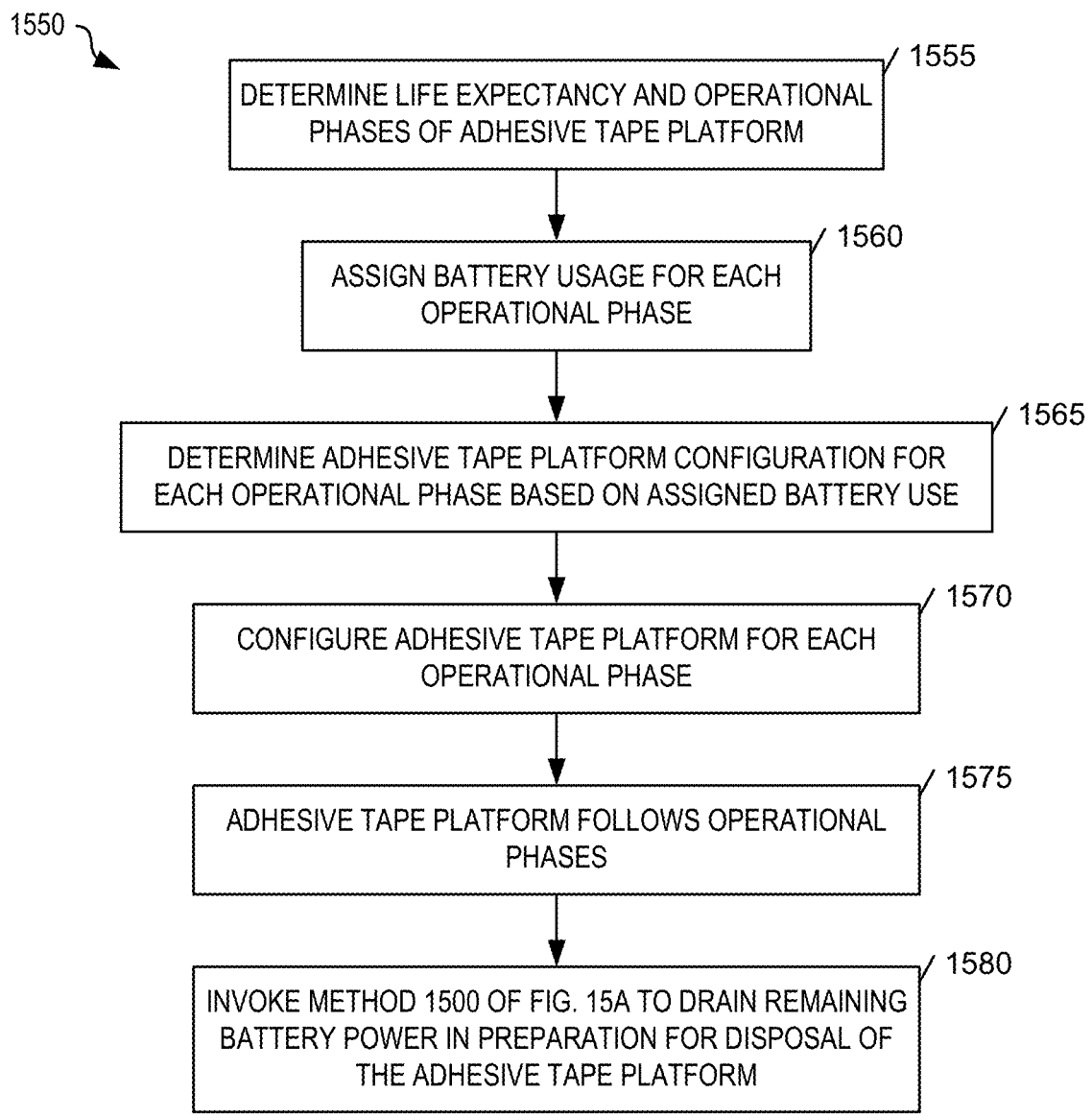
FIG. 15D is a flowchart illustrating one example method for controlling battery usage of an adhesive tape platform during each phase of its expected life such that the battery is depleted at the end of the expected life of the adhesive tape platform, in embodiments.

FIG. 15D is a flowchart illustrating one example method 1550 for controlling battery usage of an adhesive tape platform (e.g., the adhesive tape platform 112 of FIG. 1, tape nodes, and tape agents, as described above) during each phase of its expected life such that the battery is depleted at the end of the expected life of the adhesive tape platform. That is, the adhesive tape platform controls its use of battery power such that its battery is substantially exhausted (e.g., all but a reserve amount is used) when the adhesive tape platform reaches the end of its useful life, and is therefore substantially in a safe state for disposal. Method 1550 is implemented by the distributed intelligent software of the IOT system (e.g., tracking system). Unlike the method 1520 of FIG. 15B, where the adhesive tape platform detects the end of its useful life and then drains any remaining power from its battery, the method 1550 of FIG. 15D causes the adhesive tape platform to use substantially all (e.g., except for a reserve amount of power) available battery power during its useful life, such that when its useful life ends, its battery is almost depleted and is safe for disposal. In one example of operation, the adhesive tape platform adjusts its operational activities for each phase of its useful life such that it provides an optimal service and leaves its battery at a low level when its useful life ends.

In block 1555, a life expectancy and operational phases of the adhesive tape platform is determined. In one example of block 1555, the operational phases of the tape node 918 are determined to include the shipping phase 1532, the air freight phase 1534, the receiving phase 1536, and the final delivery phase 1538, and the life expectancy of the tape node 918 is determined based on the expected transit duration of the asset 910, which may be the sum of the durations of each of the operational phases. That is, the life expectancy of the tape node 918 is from activation of the tape node 918 when it is associated with (e.g., attached to) the asset 910 in preparation for shipping 1532 until the time the asset 910 reaches its destination location after the final delivery phase 1538 is completed. That is, since the delivery of the asset 910 is set of scheduled phases, the adhesive tape platform has associated operational phases with associated configurations that control the adhesive tape platform to perform actions associated with each of the operational phases.

In block 1560, the battery usage (e.g., a percentage of available battery power) for each operational phase is assigned. In one example of block 1560, fifteen percent of battery power is assigned to the shipping phase 1532, ten percent of the battery power is assigned to the air freight phase 1534, fifteen percent of the battery power is assigned to the receiving phase 1536, and fifty percent of the battery power is assigned to the final delivery phase 1538 since this is considered a more critical phase of the assets 910 transit, leaving ten percent of the battery power in reserve (e.g., to allow for transit changes). For example, the battery power assigned for each operational phase of the adhesive tape platform may be based upon a priority of that operational phase (e.g., a priority of tracking for a particular freight phase 1530) and of required functions of the adhesive tape platform needed for that freight phase 1530. For example, the air freight phase 1534 may not permit wireless communication or GPS tracking, and therefore the adhesive tape platform cannot use much battery power while in the air freight phase 1534. However, where the final delivery phase 1538 is considered the most important, the adhesive tape platform may be expected to track location frequently, communicate frequently, and read sensors frequently, and therefore the adhesive tape platform is likely to consume more battery power in this phase than in others. Other percentage values may be determined based on tracking priorities for each phase of the transit, and a greater or smaller reserve power percentage may be assigned without departing from the scope hereof.

In block 1565, one adhesive tape platform configuration is determined for each of the operational phases based on the assigned battery power. In one example of block 1560, the tape node 918 configuration for the shipping phase 1532 defines a low-fidelity location mode, the tape node 918 configuration for the air freight phase 1534 does not use GPS or wireless communication to capture location, but may still capture accelerations associated with the asset 910, the tape node 918 configuration for the receiving phase 1536 defines a low-fidelity location mode, and the tape node 918 configuration for the final delivery phase 1538 defines a high-fidelity location mode whereby location is determined and communicated to the tracking system at a higher rate as compared to the low-fidelity mode. The adhesive tape platform transitions though at least one operational phase during transit of the asset 910, however, based on the importance of each operational phase and the assigned battery power, the tape node 918 is configured to sense and capture data at a rate commensurate with the available power. That is, the tape node 918 configuration defines a sensor and location capture rate that uses the assigned percentage of battery power. Advantageously, by configuring the operational phases based on assigned battery power, at the end of the operation life of the adhesive tape platform (e.g., the tape node 918), only a reserve amount of battery power remains, thereby reducing the risk of damage when the adhesive tape platform is removed from the asset for disposal. Further, as described above for FIG. 15B, the adhesive tape platform may also detect its end-of-life event and drain the remaining battery power; however, since only a reserve amount of battery power remains, this is quicker and safer through the described battery management.

In block 1570, the adhesive tape platform is configured for each operational phase. In one example of block 1570, the tape node 918 determines a first configuration corresponding to the shipping phase 1532, a second configuration corresponding to the air freight phase 1534, a third configuration corresponding to the receiving phase 1536, and a fourth configuration corresponding to the final delivery phase 1538. Particularly, the configuration for each phase takes into account needed functionality (e.g., communication, processing, sensor reading, and so on) of the adhesive tape platform and a frequency of each function may be adjusted based on the assigned battery usage for that operational phase. For example, a frequency of sensing its current location using GPS and wirelessly reporting that location to another node may be adjusted based upon available battery power and a duration of the operational phase. In another example, where the adhesive tape platform includes a power-saving sleep mode (e.g., where processing is suspended intermittently when not needed), the duration and/or frequency of the sleep mode may be adjusted based on assigned battery usage.

In block 1575, the adhesive tape platform follows the operational phases. In one example of block 1575, the tape node 918 configures itself in the first configuration during the shipping phase 1532, detects the transition from the shipping phase 1532 to the air freight phase 1534 and configures itself in the second configuration during the air freight phase 1534, detects the transition from the air freight phase 1534 to the receiving phase 1536 and configures itself in the third configuration during the receiving phase 1536, and detects the transition from the receiving phase 1536 to the final delivery phase 1538 and configures itself in the fourth configuration during the final delivery phase 1538. When the adhesive tape platform reaches the final destination, its battery is at a safe level for disposal.

Block 1580 is optional. If included, in block 1580, the method 1520 of FIG. 15B is invoked to drain remaining battery power in preparation for disposal of the adhesive tape platform.

Where the expected operational life of the adhesive tape platform changes during operation, such as when a delay in shipping occurs or when another problem occurs, the assigned battery usage may be dynamically adjusted to prevent the adhesive tape node from running out of battery power. In certain embodiments, at the start of each operational phase, the level of battery power remaining in the battery is determined and the configuration for that operational phase adjusted based on differences between an expected battery level and the determined battery level.

Extending Battery Shelf Life

The form factor of an adhesive tape platform requires that the battery is activated when incorporated during manufacture. For example, an embedded zinc-air battery incorporated into the adhesive tape platform is activated during manufacture because access to the battery to remove an air barrier of the battery is not possible after manufacture. Where the adhesive tape platform is used shortly after manufacture, its shelf life is not important. However, one aspect of the present embodiments includes the realization that when the battery is activated during manufacture and the adhesive tape platform is not used immediately, the shelf life of the adhesive tape platform becomes more significant. A roll (e.g., roll 116 of FIG. 1) of adhesive tape platforms may be kept in a store room for several months prior to being deployed. A zinc-air battery is a high power to volume/weight density technology where conventionally a flap is removed from the battery to activate it. However, when the battery is embedded within a wireless IOT device (e.g., an adhesive tape platform), the flap is difficult/cumbersome to remove. Thus, when the battery is activated during manufacture, the battery is being consumed when in storage prior to use with the adhesive tape platform. The present embodiments solve this problem by providing a mechanism to activate the battery after manufacture and prior to use. Advantageously, since the battery is not activated at manufacture, the shelf life of the adhesive tape platform is extended.

Figure 16A:
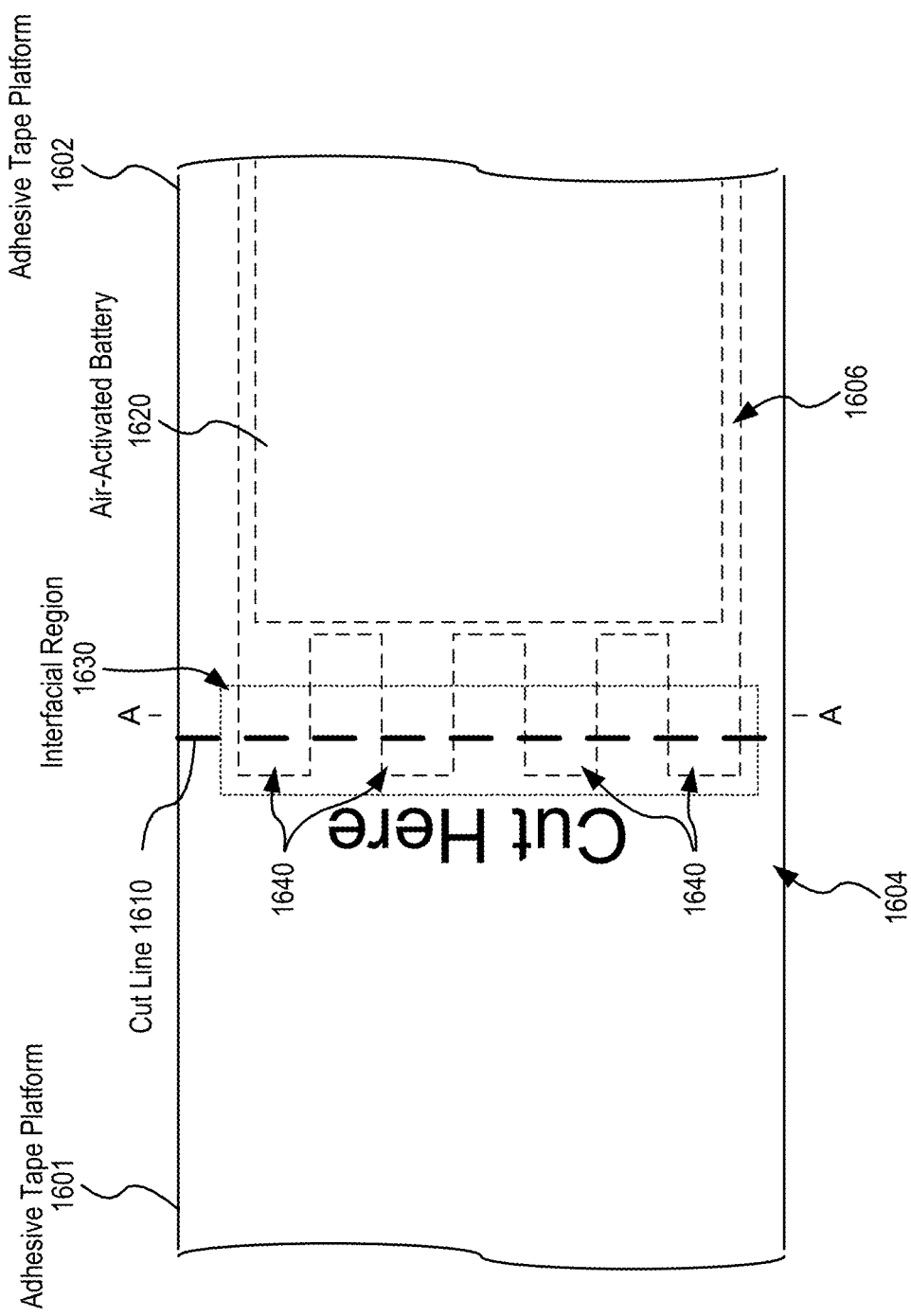
FIGS. 16A and 16B show one example adhesive tape platform with post-manufacture battery activation, in embodiments.
Figure 16B:
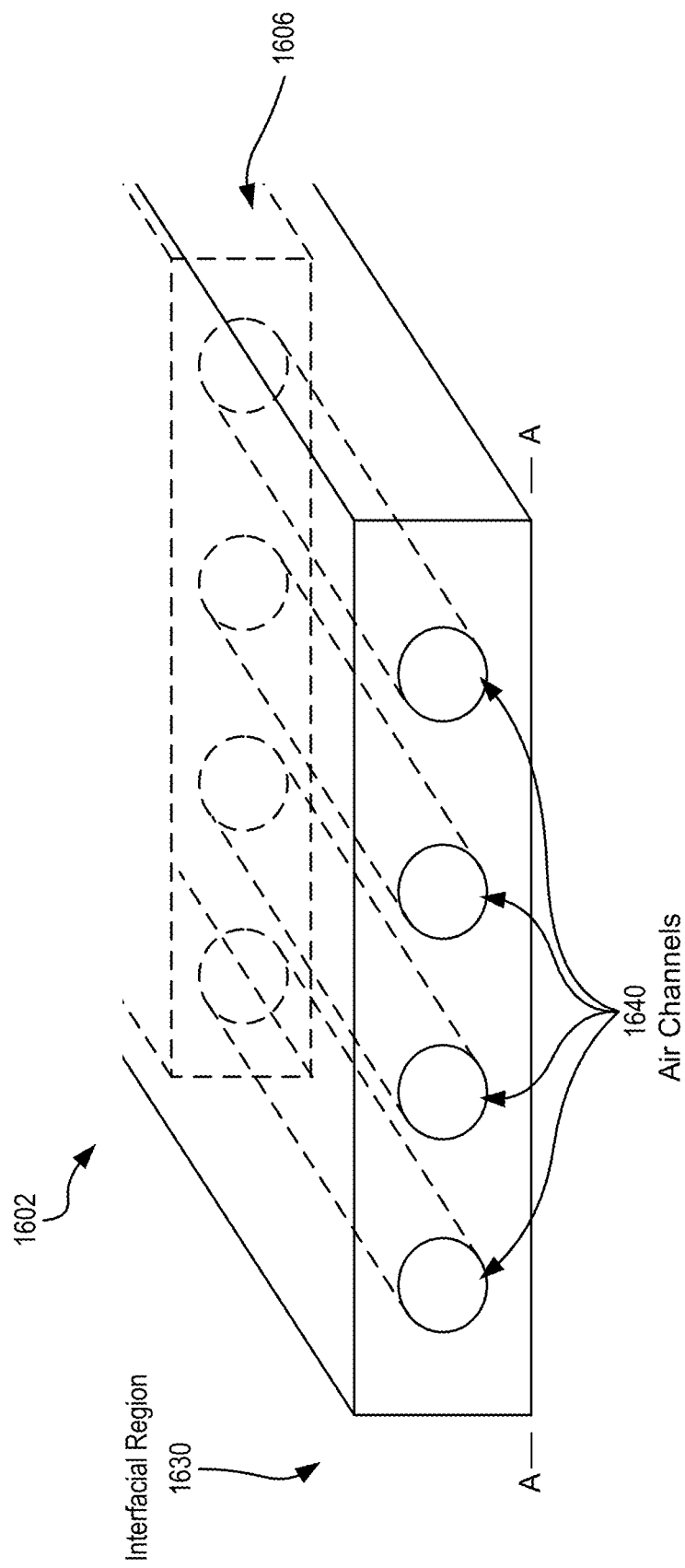

FIGS. 16A and 16B show one example adhesive tape platform 1602 with post-manufacture battery activation, in embodiments. FIG. 16A shows a cut line 1610 on a surface of a tape structure 1604 indicating where to cut to separate an adhesive tape platform 1602 from an adjoined (e.g., as segments on roll 116 of FIG. 1) adhesive tape platform 1601, where cutting along the cut line 1610 to separate the adhesive tape platform 1602 from the adhesive tape platform 1601 (e.g., the roll) also activates an air-activated battery 1620 (e.g., zinc-air battery) of the adhesive tape platform 1602. FIG. 16B shows a cross-section A-A of the adhesive tape platform 1602 of FIG. 16A. FIGS. 16A and 16B are best viewed together with the following description.

The adhesive tape platforms 1601 and 1602 may represent the adhesive tape platform 112 of FIG. 1, segments 332 of FIG. 3, segments 502 and 504 of FIG. 5, and/or any of the above-described tape nodes, agents, etc. The battery 1620 may be any type of battery that is activated by air. The tape structure 1604 forms the adhesive tape platform 1602 by encapsulating electronic circuitry (e.g., wireless transducing circuit 410 of FIG. 4) and forming an internal chamber 1606 for containing the battery 1620 that provides power to the electronic circuit. A plurality of internal air channels 1640 are formed within the tape structure 1604 to connect at a first end with the chamber 1606, run perpendicular to and under the cut line 1610, and into an interfacial region 1630 between the two adhesive tape platforms 1601 and 1602 where the air channels 1640 terminate. Accordingly, the chamber 1606 and the air channels 1640 are not open to ambient air while the two adhesive tape platforms 1601 and 1602 remain joined. When the adhesive tape platform 1602 is separated from the adhesive tape platform 1601 by cutting along the cut line 1610, the air channels 1640 are opened to allow air to flow into the chamber 1606 and activate the battery 1620. Although shown as having a circular cross-sectional shape, the air channels may be of any cross-sectional shape without departing from the scope hereof.

In one example of adhesive tape platform 1601/1602 manufacture, the battery 1620 is assembled into the chamber 1606 within an inert environment (e.g., low oxygen environment) to prevent exposure of the battery 1620 to air. In some embodiments, the battery 1620, the chamber 1606, and the air channels 1640 (and/or barrier flap 1910 of FIG. 19) are pre-formed and pre-assembled in a low-oxygen environment (e.g., they are hermetically sealed before being integrated into the adhesive tape platform). In this example, the air channels 1640 are part of the battery enclosure/chamber 1606. In another example, the battery enclosure/chamber 1606 has its own air channels that connect to and/or correspond to, the air channels 1640 of the substrate/tape structure. In certain embodiment, the air channels 1640 are pre-formed during manufacturing of the substrate, or during manufacturing of the enclosure/chamber 1606. For example, the air channels 1640 may be etched, cut, drilled, molded, or formed by any normal manufacturing means for shaping or cutting a channel into a substrate.

The number and/or size of the air channels 1640 may be different based on the desired air flow to the battery 1620. There may be no minimum number or size of the air channels 1640, but the air channels 1640 may be selected based on the design and function of the battery 1620. The battery electrically couples with, and powers once activated, the electronic circuit (e.g., the wireless transducing circuit 410 of FIG. 4) to provide the functionality of the adhesive tape platform 1601.

Figure 17A:
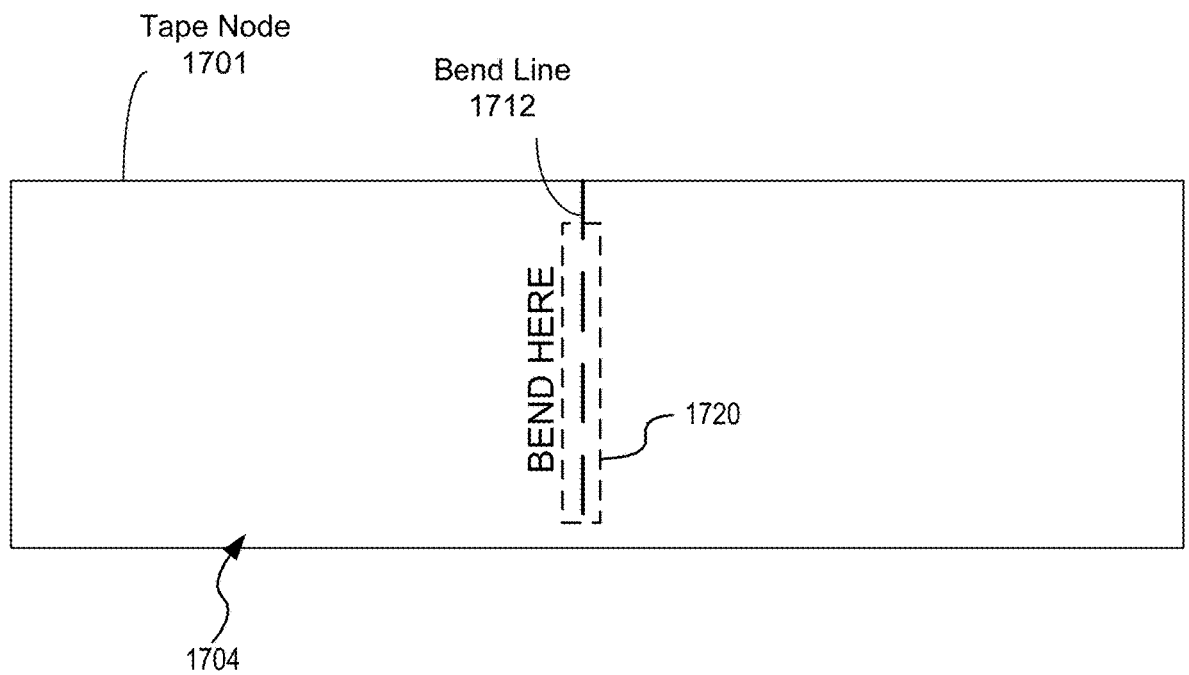
FIGS. 17A-17B show one example adhesive tape platform with post-manufacture battery activation, in embodiments.
Figure 17B:
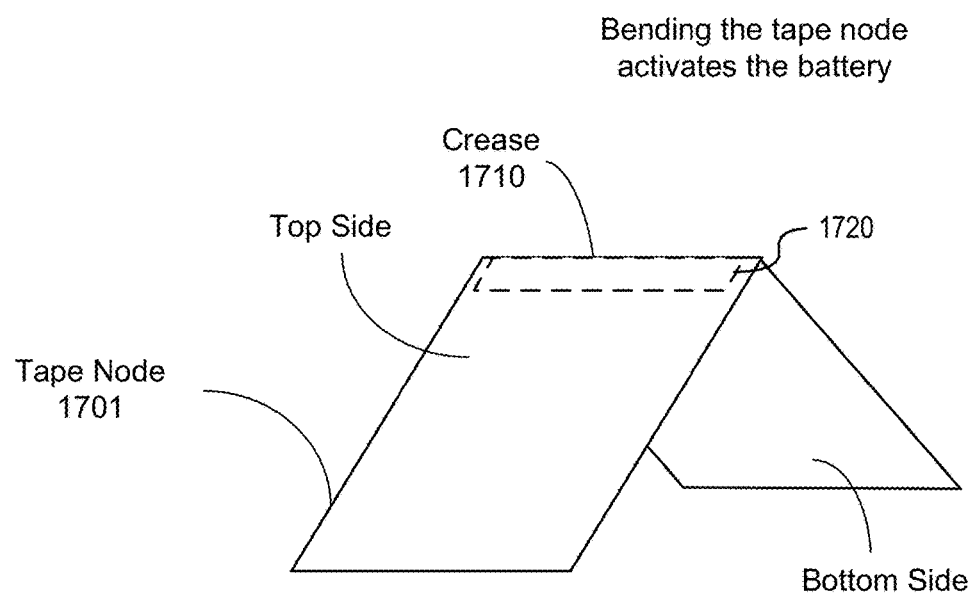

FIGS. 17A-17B show one example adhesive tape platform 1701 with post-manufacture battery activation, according to some embodiments. The adhesive tape platform 1701 has a tape structure 1704 that includes (e.g., encapsulates) a battery that is activated by bending the adhesive tape platform 1701 along a bend line 1712 indicated on an outer surface of the tape structure 1704. FIG. 17A shows the adhesive tape platform 1701 prior to bending (i.e. flat) and FIG. 17B shows the adhesive tape platform 1701 bent along the bend line 1712 to activate the battery. FIGS. 17A and 17B are best viewed together with the following description.

In a first embodiment, the battery is disconnected from a circuit (e.g., wireless transducing circuit 410 of FIG. 4) of the adhesive tape platform 1701 by an internal mechanism 1720 within the tape structure 1704, such that the circuit is not activated and the battery does not drain. When the adhesive tape platform 1701 is bent along the bend line 1712, the internal mechanism 1720 is permanently disabled and the battery electrically connects with the circuit of the adhesive tape platform 1701 and the adhesive tape platform 1701 is activated.

In another embodiment, the internal mechanism 1720 is one or more of a pouch and membrane that separates one or more chemicals (e.g., electrolytes) from the battery such that the battery is not activated. When the adhesive tape platform 1701 is bent along the bend line 1712, the internal mechanism is disabled (e.g., pouch and/or membrane are ruptured) to release the battery chemicals and activate the battery. In certain embodiments, the internal mechanism 1720 includes one or more battery chemicals encapsulated in at least one pouch that is punctured, or ruptured, when the adhesive tape platform 1701 is bent along the bend line 1712, thereby releasing the chemicals and activating the battery to power the circuit of the adhesive tape platform 1701. For example, the structure of the pouch and/or membrane has some level of fragility or brittleness that cannot withstand a degree of bending without forming pores, cracks, or breakage. For example, a thin glass membrane separating two chemical may be broken by bending and allow the chemical to mix and activate the battery.

Figure 18:
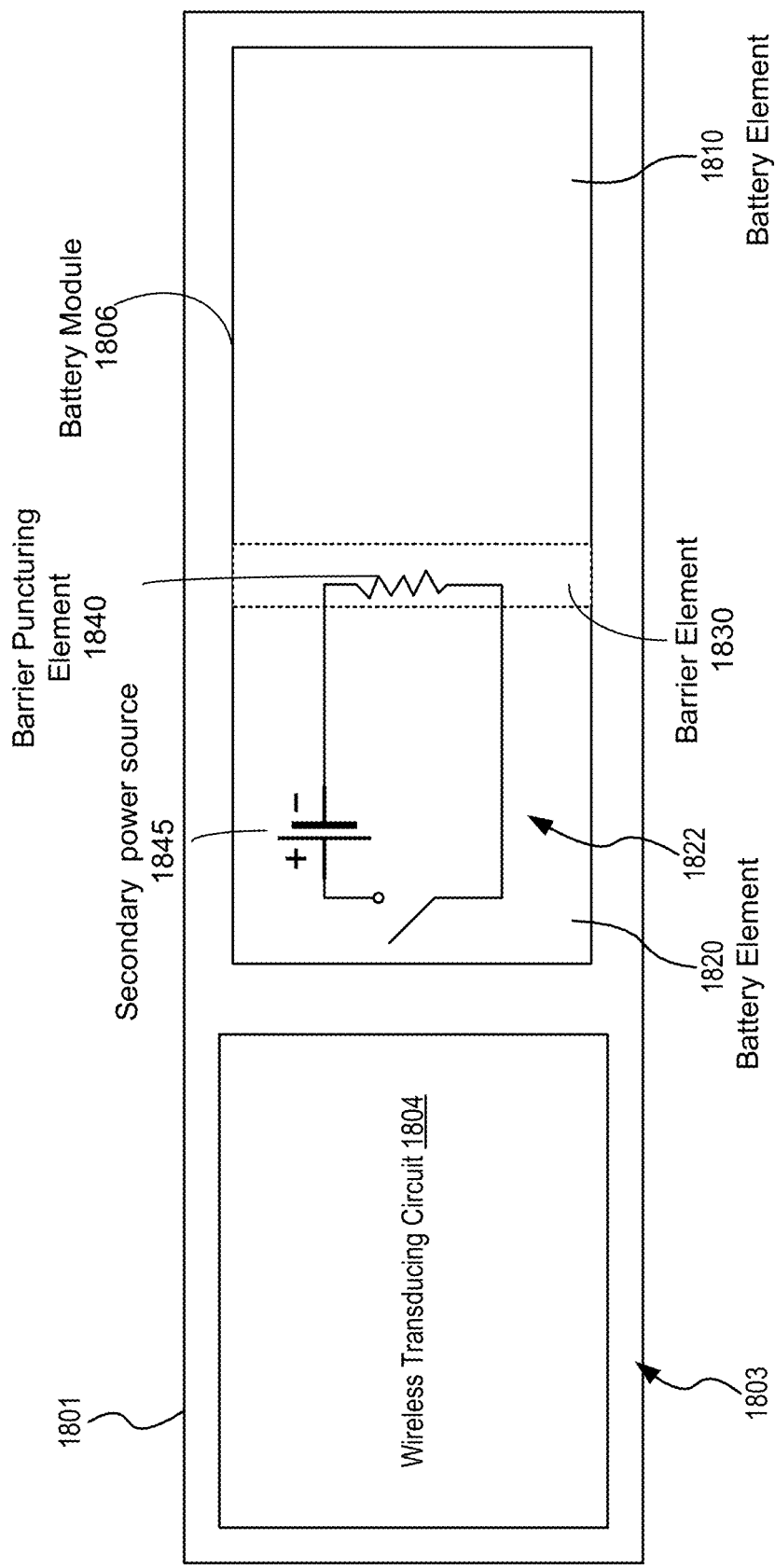
FIG. 18 shows one example adhesive tape platform with a wireless transducing circuit and a battery module that may be wirelessly activated, in embodiments.

FIG. 18 shows one example adhesive tape platform 1801 with a wireless transducing circuit 1804 and a battery module 1806 that may be wirelessly activated, according to some embodiments. The adhesive tape platform 1801 is formed by a tape structure 1803 that may encapsulate the wireless transducing circuit 1804 and the battery module 1806. The battery module 1806 has two battery elements 1810 and 1820 that are separated by a barrier element 1830 (e.g., a membrane separating the battery chemicals) that prevents activation of the battery formed by the two battery elements 1810 and 1820. The battery module 1806 also includes a battery activation circuit 1822 and a secondary power source 1845 that is electrically coupled to provide electrical power to the wireless transducing circuit 1804. In some embodiments, the secondary power source 1845 has a greater shelf life and a lower energy density than the primary battery formed by the two battery elements 1810 and 1820. The wireless transducing circuit 1804 may operate in an initial state that activates, at intervals, its low-powered wireless interface to detect and/or receive a wireless activation signal (e.g., from a client device, a tape node, a gateway, or other node of the IOT system, etc.). When the wireless transducing circuit 1804 receives the wireless activation signal, it activates the battery activation circuit 1822. The battery activation circuit 1822 includes a barrier puncturing element 1840 that, when driven from the secondary power source 1845, punctures, damages, removes, or otherwise alters, the barrier element 1830 such that the two battery elements 1810 and 1820 interact to activate the primary battery and generate electrical power for powering the adhesive tape platform 1801. In certain embodiments, the barrier puncturing element 1840 is one or more microelectromechanical systems (MEMS) devices that puncture or rupture the barrier element 1830. In other embodiments, a mechanical component may be pressed by a user to cause a pouch containing the electrolyte to puncture, releasing the electrolyte to activate the battery. In another embodiment, the barrier puncturing element 1840 is one or more heating elements that are activated to burn or breakdown the barrier element 1830. In certain embodiments, the barrier element 1830 is at least partially conductive, whereby the barrier element 1830 self-heats and breaks down when current flows through it. In one example, the barrier element 1830 is composed of a heat sensitive material that undergoes thermal decomposition at a given temperature, such as a polymer material and/or a plastic material that melts or breaks down in response to heat.

Advantageously, the primary battery of the battery module 1806 is not activated until required, thereby improving shelf life of the adhesive tape platform 1801, and allowing the adhesive tape platform 1801 to be activated wirelessly by another node of the IOT system.

A further advantage of using wireless activation is that multiple adhesive tape nodes may be simultaneously activated. For example, where a user takes a roll (e.g., roll 116) from a storage room and the IOT system associated with the adhesive tape platforms on the roll determines (e.g., the IOT system receives a deployment request or other similar instructions) that the whole roll will be deployed on assets (or for other uses) in a short period (e.g., one day or a few days), the IOT system may wirelessly activate all the batteries, and thus the corresponding adhesive tape platforms, on the roll prior to the separation from the roll and use. In another example, a user collecting the roll from the storage room uses a client device (e.g., client device 910) to activate all tape nodes on the roll in preparation for deployment. In another example, a user activates a first tape node on the roll using the client application 922 running on the client device 910, and the client application 922, determining that additional tape nodes are required for a current task (e.g., shipment of many assets) automatically activates additional tape nodes on the roll. In another example, a user informs the server 904, through interaction with the client application 922 of the client device 910, that a large number of tape nodes are required for a task (e.g., shipment of many assets). The server 904 identifies a suitable roll of unused tape nodes in a storage room, and instructs a stationary gateway 914, located within the storage room, to activate the required number of tape nodes on the identified roll 116, the stationary gateway 914 wirelessly activates the corresponding tape nodes. The server 904 instructs the client application 922 to display the identity of the activated roll on the client device 910, thereby allowing the user to collect the roll. Advantageously, this gives the batteries time to activate prior to their use (e.g., where battery chemistry has a long lead time before the battery is fully powered on), and this may also provide any needed time to warm up, or cool down, the battery, depending on ambient conditions of the adhesive tape platform, prior to use.

Figure 19A:
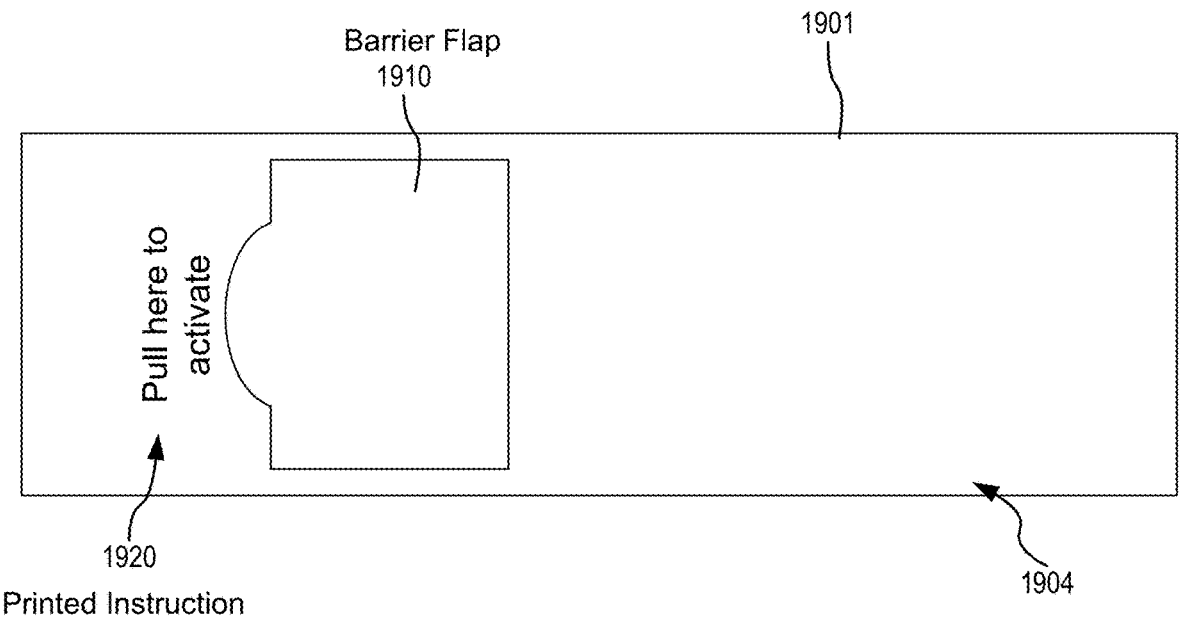
FIGS. 19A and 19B shows one example adhesive tape platform that includes a barrier flap with a printed instruction indicating that of the barrier flap should be removed to activate the adhesive tape platform, in embodiments.
Figure 19B:
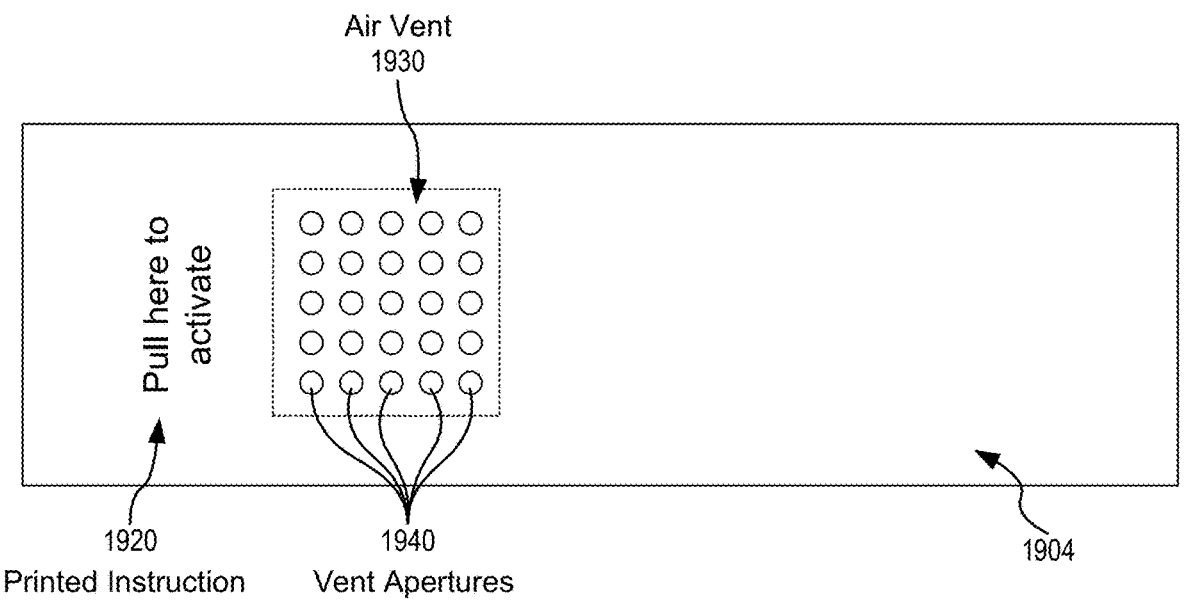

FIG. 19A shows one example adhesive tape platform 1901 that includes a barrier flap 1910 with a printed instruction 1920 indicating that of the barrier flap 1910 should be removed from the adhesive tape platform 1901 to activate the adhesive tape platform 1901, according to some embodiments. FIG. 19B shows the adhesive tape platform 1901 of FIG. 19A with the barrier flap 1910 removed to uncover an air vent 1930 with one or more vent apertures 1940.

In this example, the adhesive tape platform 1901 is a tape structure 1904 that forms an internal chamber to enclose or encapsulate an air-activated battery (not shown) and form the air vent 1930 fluidly coupled with the internal chamber, where the barrier flap 1910 is positioned on an outer surface of the tape structure 1904 to cover the air vent 1930 and prevent air flowing to the battery (or to a compartment that includes the battery). When the barrier flap 1910 is removed, air flows through the one or more vent apertures 1940 of the air vent 1930 to activate the air-activated battery, and thus activate the adhesive tape platform 1901. In certain embodiments, the barrier flap 1910 is integrated in a region that overlaps two tape nodes that are connected to each other (e.g., on a roll, FIG. 1), such that the barrier flap 1910 is removed when the two adhesive tape platforms 1901 are separated, the battery is activated, and thus the adhesive tape platform that is separated is also activated.

In certain embodiments, where multiple adhesive tape platforms are concatenated in a row (e.g., on a roll, or part of a roll, or a strip), a single barrier flap may cover air vents 1930 of all adhesive tape platforms 1901 in the row, such that removal of the single barrier flap activates all the adhesive tape platforms simultaneously.

Figure 20:
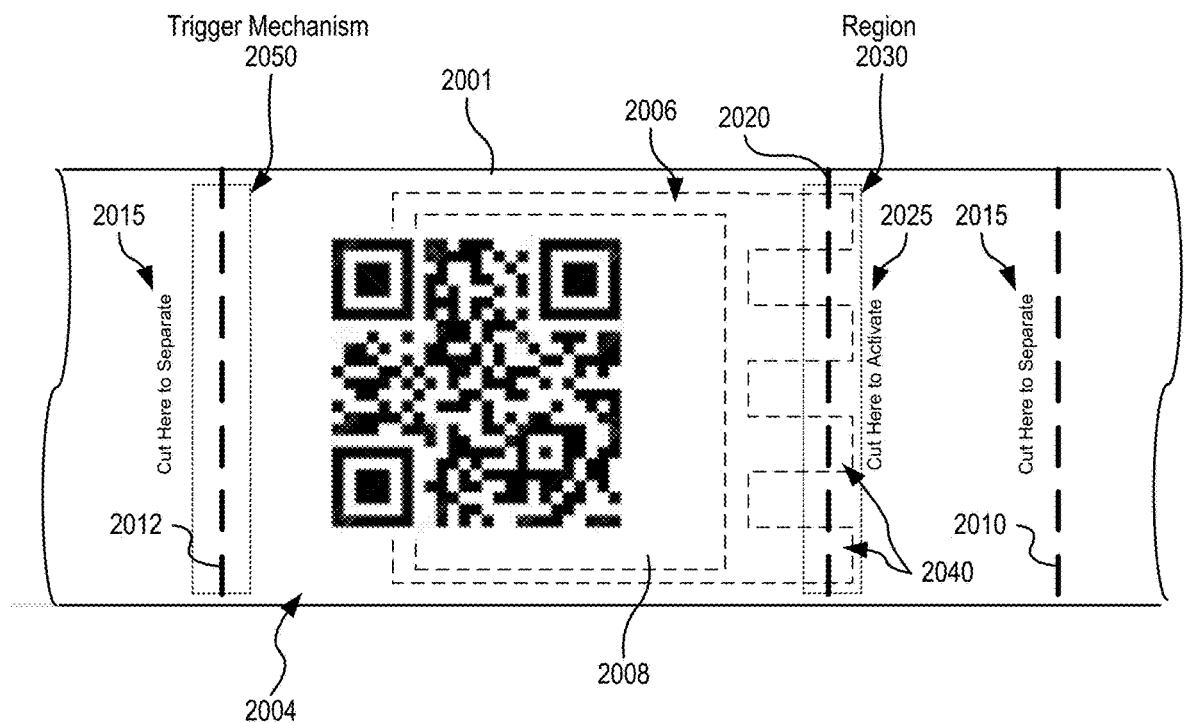
FIG. 20 shows one example adhesive tape platform in a portion of a roll with multiple cut lines indicating that the segment may be cut multiple times, in embodiments.

FIG. 20 shows one example adhesive tape platform 2001 (e.g., adhesive tape platform 112, FIG. 1) in a portion of a roll (e.g., roll 116 of FIG. 1) with multiple cut lines 2010, 2012, and 2020 indicating that the segment may be cut multiple times, where cutting along the cut lines has different actions, according to some embodiments. In this example, a tape structure 2004 forms the adhesive tape platform 2001 by encapsulating electronic components and a battery (not shown) of the adhesive tape platform 2001 and that is part of the roll with multiple segments that each contain at least one adhesive tape platform. The tape structure 2004 has separation cut lines 2010, 2012, with associated separation instructions 2015, formed on an outer surface of the tape structure 2004 to instruct a user where to cut to separate the adhesive tape platform 2001 from others on the roll. The top surface of the tape structure 2004 also has a battery activation cut line 2020, with associated battery activation instructions 2025, that indicate where the user is to cut to activate the adhesive tape platform 2001.

Similar to the embodiment of FIGS. 16A and 16B, the tape structure 2004 forms the adhesive tape platform 2001 by encapsulating electronic circuitry (e.g., wireless transducing circuit 410 of FIG. 4) and forming an internal chamber 2006 for containing an air-activated battery 2008 that provides power to the electronic circuit. A plurality of internal air channels 2040 are formed within the tape structure 2004 to connect at a first end with the chamber 2006, run perpendicular to and under the battery activation cut line 2020, and into a region 2030 where the air channels 2040 terminate. Accordingly, the chamber 2006 and the air channels 2040 are not open to ambient air prior to cutting along the battery activation cut line 2020. When the adhesive tape platform 2001 is activated, by cutting along the battery activation cut line 2020, the air channels 2040 are opened to allow air to flow into the chamber 2006, activating the battery 2008, and thereby activating the adhesive tape platform 2001. However, unlike the embodiments of FIGS. 16A and 16B, the adhesive tape platform 2001 is separable from other adhesive tape nodes on the roll without activating its air-activated battery.

In certain embodiments, adhesive tape platform 2001 may be activated prior to separation from the roll by cutting along battery activation cut line 2020 prior to cutting along the separation cut line 2012, where by cutting along the separation cut line 2012 initializes certain functionality or component of the adhesive tape platform 2001 (e.g., wakes up the adhesive tape platform and initiates configuration of the adhesive tape platform). In this embodiment, the tape structure 2004 includes a trigger mechanism 2050 (e.g., similar to circuit 775 and loop 752 of FIGS. 7A and 7B) that provides an input to the electronic circuit of the adhesive tape platform 2001 when the user cuts along the separation cut line 2012. In certain embodiments, the circuit 775 and loop 782 of FIGS. 7A-7C may also activate the battery of the tape node.

Further Advantages of Controlled Activation

Advantageously, these different mechanisms for activating the battery of the adhesive tape platform allow for different ways of deploying the adhesive tape platforms. In one example, each adhesive tape platform is activated just before deploying the adhesive tape platform, such as when separated from a roll. In another example, a group (e.g., roll, strip etc.) of adhesive tape platforms are collectively activated some period prior to deployment of the adhesive tape nodes. In certain embodiments, a user may activate one adhesive tape platform on a roll, which then communicates and activates other adhesive tape platforms on the same roll. In one example, the roll of tape nodes may include a bus that runs through the entire roll, connecting with every tape node on the roll. Further details of the bus are found in U.S. Patent Application No. 63/087,306. The bus thereby allows one tape node on the roll to send a wired activation signal to other tape nodes on the roll. In another example, where the tape nodes on the roll each have a secondary power source 1845 as shown in FIG. 18, the wireless transducing circuits 1804 of the tape nodes may communicate with each other wirelessly while on the roll. Accordingly, one tape node on the roll sends a wireless activation signal to other tape nodes on the roll.

In another example, a group of adhesive tape platforms are activated and configured prior to deployment, which is useful in cases where the activation and initialization takes time before the adhesive tape platform is ready for use. In another example, the adhesive tape platform may be deployed (e.g., associated with an asset) and activated later (e.g., when the asset is about to be shipped).

In certain embodiments, a first cut line allows an adhesive tape platform to be separated from a roll without activation, and a second cut line allows the adhesive tape platform to be activated at a later time. In other embodiments, an adhesive tape platform includes a secondary battery that provides power for limited functionality of the adhesive tape platform prior to activation of the primary battery.

In certain embodiments, adhesive tape platforms on a roll (or strip) each include a primary battery that is activated wirelessly and a secondary battery that is air activated. However, the roll (or strip) is sealed from air to prevent activation of the secondary batteries until the roll is expected to be used. For example, removing a protective film from the roll or strip activates the secondary batteries of all adhesive tape platforms on the roll (or strip). Advantageously, the shelf life of the roll is significantly increased compared to the shelf life of a roll where the secondary batteries are activated at manufacture.

Figure 21:
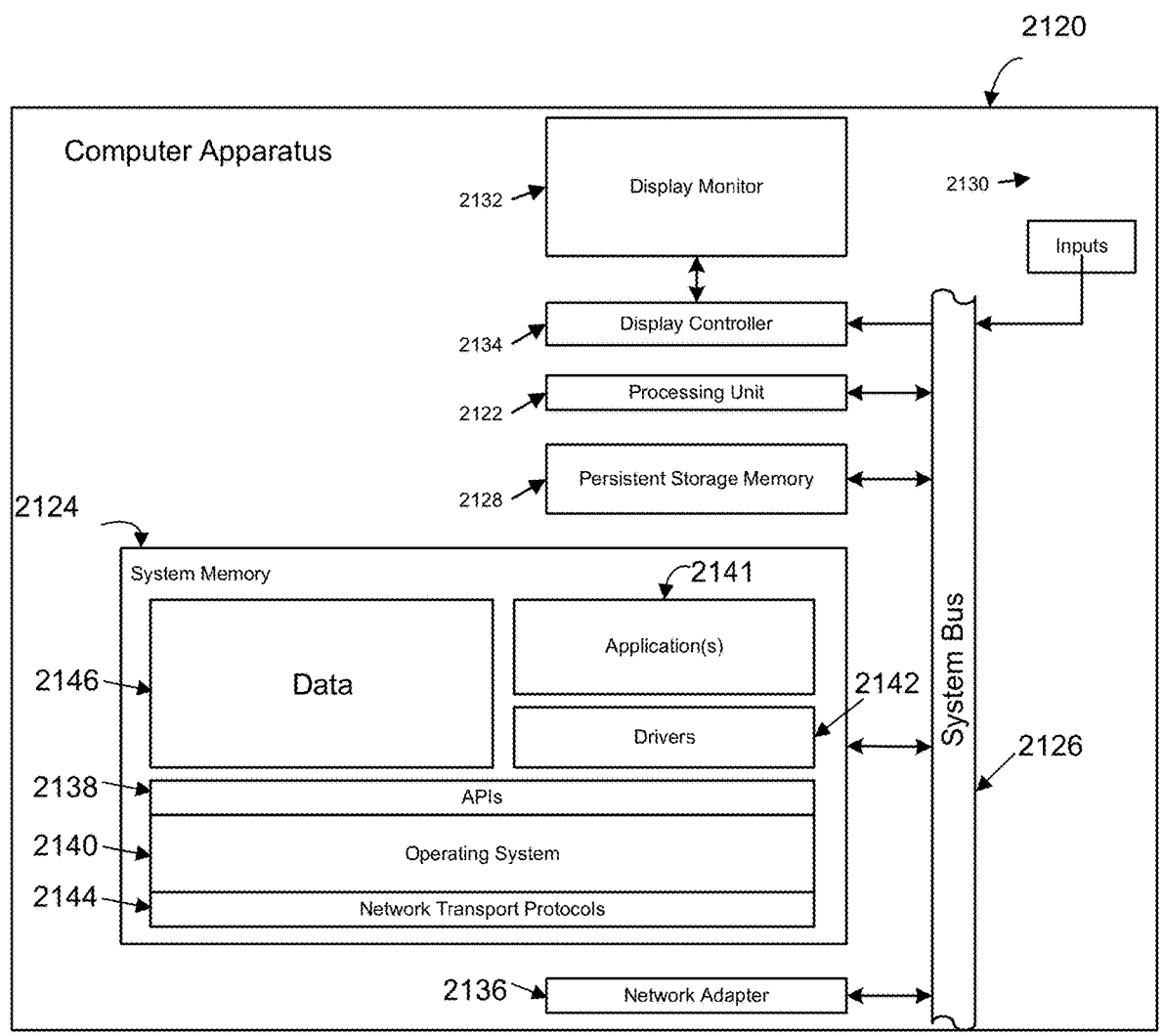
FIG. 21 shows an example embodiment of computer apparatus that, either alone or in combination with one or more other computing apparatus, is operable to implement one or more of the computer systems described in this specification, in embodiments.

FIG. 21 shows an example embodiment of computer apparatus 2120 that, either alone or in combination with one or more other computing apparatus, is operable to implement one or more of the computer systems described in this specification. For example, computer apparatus 2120 may represent any of . . . . The computer apparatus 2120 includes a processing unit 2122, a system memory 2124, and a system bus 2126 that couples the processing unit 2122 to the various components of the computer apparatus 2120. The processing unit 2122 may include one or more data processors, each of which may be in the form of any one of various commercially available computer processors. The system memory 2124 includes one or more computer-readable media that typically are associated with a software application addressing space that defines the addresses that are available to software applications. The system memory 2124 may include a read only memory (ROM) that stores a basic input/output system (BIOS) that contains start-up routines for the computer apparatus 2120, and a random-access memory (RAM). The system bus 2126 may be a memory bus, a peripheral bus, or a local bus, and may be compatible with any of a variety of bus protocols, including PCI, VESA, Microchannel, ISA, and EISA. The computer apparatus 2120 also includes a persistent storage memory 2128 (e.g., a hard drive, a floppy drive, a CD ROM drive, magnetic tape drives, flash memory devices, and digital video disks) that is connected to the system bus 2126 and contains one or more computer-readable media disks that provide non-volatile or persistent storage for data, data structures and computer-executable instructions.

A user may interact (e.g., input commands or data) with the computer apparatus 2120 using one or more input devices 2130 (e.g. one or more keyboards, computer mice, microphones, cameras, joysticks, physical motion sensors, and touch pads). Information may be presented through a graphical user interface (GUI) that is presented to the user on a display monitor 2132, which is controlled by a display controller 2134. The computer apparatus 2120 also may include other input/output hardware (e.g., peripheral output devices, such as speakers and a printer). The computer apparatus 2120 connects to other network nodes through a network adapter 2136 (also referred to as a "network interface card" or NIC).

A number of program modules may be stored in the system memory 2124, including application programming interfaces 2138 (APIs), an operating system (OS) 2140 (e.g., the Windows® operating system available from Microsoft Corporation of Redmond, Wash. U.S.A.), software applications 2141 including one or more software applications programming the computer apparatus 2120 to perform one or more of the steps, tasks, operations, or processes of the positioning and/or tracking systems described herein, drivers 2142 (e.g., a GUI driver), network transport protocols 2144, and data 2146 (e.g., input data, output data, program data, a registry, and configuration settings).

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Combination of Features

Features described above as well as those claimed below may be combined in various ways without departing from the scope hereof. For example, it will be appreciated that aspects of one sensing device/sensing material described herein may incorporate or swap features of another sensing device/material described herein. The following examples illustrate possible, non-limiting combinations of embodiments described above. It should be clear that many other changes and modifications may be made to the methods and apparatus herein without departing from the spirit and scope of this invention:

(A) A method for preparing an adhesive tape platform with a battery for disposal at an end of its useful life, includes: determining, by the adhesive tape platform, the end of its useful life; responsive to the determination, performing, by the adhesive tape platform, an action to drain remaining battery life of the battery; determining when remaining life in the battery is less than a threshold level; and transmitting a notification indicating the adhesive tape platform is ready for disposal to an Internet of Things (IOT) system that includes the adhesive tape platform.

(B) In the method denoted as (A), determining the end of its useful life for the adhesive tape platform includes receiving, from the IOT system, an instruction indicating the end of its useful life for the adhesive tape platform.

(C) In either of the methods denoted as (A) or (B), the adhesive tape platform includes one or more sensors and determining the end of its useful life for the adhesive tape platform includes determining, based on sensor data from the one or more sensors, an end-of-life event for the adhesive tape platform.

(D) In any of the methods denoted as (A)-(C), the end-of-life event includes determining that a current location of the adhesive tape platform corresponds to a destination location of an asset being transported in association with the adhesive tape platform.

(E) In any of the methods denoted as (A)-(D), the end-of-life event includes determining that the sensor data indicates a predefined movement of the adhesive tape platform.

(F) In any of the methods denoted as (A)-(E), the predefined movement corresponding to removal of the adhesive tape platform from an asset.

(G) In any of the methods denoted as (A)-(F), the predefined movement corresponding to a user action of shaking the adhesive tape platform.

(H) In any of the methods denoted as (A)-(G), the action to drain remaining battery life of the battery includes activating one or more internal circuits of the adhesive tape platform to increase battery drain.

(I) In any of the methods denoted as (A)-(H), the action to drain remaining battery life of the battery includes removing one or more parts from the battery to stop the battery from producing electricity.

(J) In any of the methods denoted as (A)-(I), the action to drain remaining battery life of the battery includes inputting air to the battery to alter chemistry of the battery to stop the battery from producing electricity.

(K) In any of the methods denoted as (A)-(J), the action to drain remaining battery life of the battery includes controlling the adhesive tape platform to increase power consumption by activating one or more functions of the adhesive tape platform at an increased rate.

(L) In any of the methods denoted as (A)-(K), the one or more functions includes one or more of activating a wireless receiver, transmitting a wireless signal, connecting to a cellular network, intense processor usage, and reading one or more sensors.

(M) Any of the methods denoted as (A)-(L) further including transmitting, to the IOT system, a second notification indicating that the battery of the adhesive tape platform is not ready for disposal when remaining life in the battery is not below the threshold level after a predefine battery drain period.

(N) Any of the methods denoted as (A)-(M) further including repeating the transmitting of the notification to the IOT system until electrical power from the battery is insufficient for operation of the adhesive tape platform.

(O) A method for preparing an adhesive tape platform with a battery for disposal at an end of its useful life, includes: determining life expectancy and operational phases of the adhesive tape platform; assigning battery usage for each of the operational phases such that the battery is depleted at an end of a last one of the operational phases; determining an adhesive tape platform configuration for each of the operational phases based on assigned battery usage; configuring the adhesive tape platform with the adhesive tape platform configuration for each operational phase; and following the operational phases with the adhesive tape platform.

(P) In the method denoted as (O), the assigned battery usage for each operational phase being based on a priority of the operational phase.

(Q) In either of the methods denoted as (O) or (P), the assigned battery usage for each operational phase being based on needed functionality of the adhesive tape platform for the operational phase.

(R) Any of the methods denoted as (O)-(Q) further including dynamically adjusting the adhesive tape platform configuration for each operational phase based on a comparison between a predicted battery level remaining and a determined battery level remaining.

(S) Any of the methods denoted as (O)-(R) further including draining remaining battery power at the end of the last one of the operational phases.

(T) Any of the methods denoted as (O)-(S) further including controlling a battery activation circuit of the adhesive tape platform to activate the battery of the adhesive tape platform in response to a wireless signal.

(U) An adhesive tape node with post-manufacture battery activation, includes: a tape structure forming an internal chamber that is not open to ambient air; at least one air channel coupled with the internal chamber and passing into an interfacial region between the adhesive tape node and an adjacent adhesive tape node on a roll, where an end of the at least one air channel, away from the internal chamber, ends within the tape structure and is sealed from ambient air; and an air-activated battery positioned in the internal chamber; wherein cutting through the tape structure at the interfacial region to separate the adhesive tape node from the adjacent adhesive tape node activates the air-activated battery.

(V) The adhesive tape node denoted as (U) further including a cut line marked on an external surface of the interfacial region to indicate where to cut, the at least one air channel passing beneath the cut line.

(W) In either of the adhesive tape nodes denoted as (U) or (V), the internal chamber and the at least one air channel being sealed from ambient air.

(X) An adhesive tape node with post-manufacture battery activation, includes: a battery; a mechanism preventing activation of the battery; a tape structure encapsulating the battery and the mechanism; a bend line visible on an outer surface of the tape structure; wherein bending the tape structure at the bend line disables the mechanism and activates the adhesive tape node.

(Y) In the adhesive tape node denoted as (X), the mechanism disconnecting the battery from a circuit of the adhesive tape node, wherein bending the tape structure at the bend line breaks the mechanism and electrically connects the battery to the circuit.

(Z) In either of the adhesive tape nodes denoted as (X) or (Y), the mechanism includes at least one pouch containing a chemical of the battery, wherein bending the tape structure at the bend line ruptures the at least one pouch to release the chemical and activate the battery.

(AA) In any of the adhesive tape nodes denoted as (X)-(Z), the mechanism includes at least one membrane separating a chemical from the battery, wherein bending the tape structure at the bend line ruptures the at least one membrane to release the chemical and activate the battery.

(AB) An adhesive tape platform with post-manufacture battery activation, includes: a primary battery; a wireless transducing circuit; a barrier element preventing activation of the primary battery; a battery activation circuit with a barrier puncturing element for permanently disabling the barrier element; a secondary battery for powering the wireless transducing circuit and the battery activation circuit; and a tape structure encapsulating the primary battery, the wireless transducing circuit, the barrier element, the secondary battery, and the battery activation circuit; wherein the wireless transducing circuit controls the battery activation circuit to trigger the barrier puncturing element to activate the primary battery in response to receiving a wireless signal.

(AC) In the adhesive tape platform denoted as (AB), the barrier puncturing element includes one or more microelectromechanical systems (MEMS) devices that mechanically puncture or rupture the barrier element.

(AD) In either of the adhesive tape platforms denoted as (AC) or (AC), the barrier puncturing element includes one or more heating elements that are activated to burn or breakdown the barrier element.

(AE) In any of the adhesive tape platforms denoted as (AB)-(AD), the barrier element being at least partially conductive and forming the barrier puncturing element of the battery activation circuit, wherein the barrier element self-heats and breaks down when current flows through it.

(AF) An adhesive tape platform with post-manufacture battery activation, includes: an air-activated battery for powering an electronic circuit of the adhesive tape node; a tape structure forming an internal chamber containing the air-activated battery, the internal chamber being fluidly coupled with an air vent formed at an outer surface of the tape structure; a barrier flap positioned on the outer surface of the tape structure to cover the air vent to prevent air flowing into the internal chamber; wherein removing the barrier flap allows air to enter the internal chamber via the air vent and activate the air-activated battery.

(AG) In the adhesive tape platform denoted as (AF), the air vent includes a plurality of vent apertures.

(AH) An adhesive tape platform with post-manufacture battery activation, includes: an electronic circuit; an air-activated battery; a tape structure encapsulating the electronic circuit and forming an internal chamber, closed to ambient air, for enclosing the air-activated battery; a first cut line positioned on an outer surface of the tape structure to instruct a user where to cut the tape structure to separate the adhesive tape platform from an adjoining adhesive tape platform; a second cut line positioned on the outer surface of the tape structure to instruct a user where to cut the tape structure to activate the adhesive tape platform; at least one air channel coupled with the internal chamber and running perpendicular to, and passing beneath, the second cut line, where an end of the at least one air channel, away from the internal chamber, ends within the tape structure and is sealed from ambient air; and wherein cutting through the tape structure along the second cut line activates the air-activated battery by allowing air to enter the internal chamber.

(AI) The adhesive tape platform denoted as (AH) further including a trigger mechanism positioned beneath the second cut line to provide an input to electronic circuit when the tape structure is cut along the first cut line.

What is claimed is:

1. A method for preparing an adhesive tape platform with a battery for disposal at an end of the adhesive tape platform's useful life, comprising:
   determining, by the adhesive tape platform, the end of the adhesive tape platform's useful life;
   responsive to the determining, by the adhesive tape platform, performing an action to drain remaining energy stored in the battery;
   determining that the remaining energy stored in the battery is less than a threshold level; and
   transmitting a notification indicating the adhesive tape platform is ready for disposal to an Internet of Things (IOT) system that includes the adhesive tape platform.

2. The method of claim 1, wherein determining the end of the adhesive tape platform's useful life comprises receiving, from the IOT system, an instruction indicating the end of its useful life for the adhesive tape platform.

3. The method of claim 1, wherein the adhesive tape platform comprises one or more sensors and determining the end of the adhesive tape platform's useful life comprises determining, based on sensor data from the one or more sensors, an end-of-life event for the adhesive tape platform has occurred.

4. The method of claim 3, the end-of-life event comprising determining that a current location of the adhesive tape platform corresponds to a destination location of an asset being transported in association with the adhesive tape platform.

5. The method of claim 3, the end-of-life event comprising determining that the sensor data indicates a predefined movement of the adhesive tape platform.

6. The method of claim 5, the predefined movement corresponding to removal of the adhesive tape platform from an asset.

7. The method of claim 5, the predefined movement corresponding to a user action of shaking the adhesive tape platform.

8. The method of claim 1, wherein the action to drain remaining energy stored in the battery comprises activating one or more internal circuits of the adhesive tape platform to increase battery drain.

9. The method of claim 1, wherein the action to drain remaining energy stored in the battery comprises removing one or more parts from the battery to stop the battery from producing electricity.

10. The method of claim 1, wherein the action to drain remaining battery life of the battery comprises inputting air to the battery to alter chemistry of the battery to stop the battery from producing electricity.

11. The method of claim 1, wherein the action to drain remaining energy stored in the battery comprises controlling the adhesive tape platform to increase power consumption by activating one or more functions of the adhesive tape platform at an increased rate.

12. The method of claim 11, the one or more functions comprising one or more of activating a wireless receiver, transmitting a wireless signal, connecting to a cellular network, intense processor usage, and reading one or more sensors.

13. The method of claim 1, further comprising transmitting, to the IOT system, a second notification indicating that the battery of the adhesive tape platform is not ready for disposal when remaining life in the battery is not below the threshold level after a predefine battery drain period.

14. The method of claim 1, further comprising repeating the transmitting of the notification to the IOT system until electrical power from the battery is insufficient for operation of the adhesive tape platform.

15. The method of claim 1, wherein the adhesive tape platform comprises:
   a flexible substrate;
   a flexible cover layer on the flexible substrate;
   a device layer in between the flexible substrate and the flexible cover layer comprising at least a wireless communication system;
   the battery; and
   a circuit connected to components of the device layer and the battery.

16. The method of claim 15, wherein the wireless communication system comprises one or more of a Bluetooth communications system, a Bluetooth low energy (BLE) communications system, a Zigbee communications system, an RFID communications system, a Wi-Fi communications system, a LoRa communications system, a LoRaWAN communication system, a GPS communications system, a satellite communications system, and a cellular communications system.

17. The method of claim 11, wherein the one or more functions comprises sensing the adhesive tape platform's current location using a wireless communications system of the adhesive tape platform.

18. The method of claim 17, wherein the one or more functions comprises transmitting data or attempting to receive data using a wireless communications system of the adhesive tape platform.

19. The method of claim 1, further comprising transmitting a notification to a user client device comprising instructions to remove the battery from the adhesive tape platform.

20. The method of claim 3, wherein the end-of-life event comprises determining that the adhesive tape platform is in a disposal area based on wirelessly receiving notifications from a number of other adhesive tape platforms in the disposal area, the notifications indicating the other adhesive tape platforms are ready for disposal.

\* \* \* \* \*